United States Patent
Kim et al.

(10) Patent No.: US 11,673,269 B2
(45) Date of Patent: Jun. 13, 2023

(54) METHOD OF IDENTIFYING DYNAMIC OBSTACLE AND ROBOT IMPLEMENTING SAME

(71) Applicant: LG ELECTRONICS INC., Seoul (KR)

(72) Inventors: Minjung Kim, Seoul (KR); Seungmin Baek, Seoul (KR); Jungsik Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 457 days.

(21) Appl. No.: 16/878,701

(22) Filed: May 20, 2020

(65) Prior Publication Data

US 2021/0146540 A1 May 20, 2021

(30) Foreign Application Priority Data

Nov. 15, 2019 (KR) .................. 10-2019-0147137

(51) Int. Cl.
| | |
|---|---|
| G06F 19/00 | (2018.01) |
| B25J 9/16 | (2006.01) |
| B25J 19/02 | (2006.01) |
| G05D 1/02 | (2020.01) |

(52) U.S. Cl.
CPC .......... B25J 9/1666 (2013.01); B25J 9/1676 (2013.01); B25J 9/1697 (2013.01); B25J 19/022 (2013.01); B25J 19/023 (2013.01); G05D 1/0214 (2013.01); G05D 1/0238 (2013.01); G05D 1/0248 (2013.01); G05D 1/0274 (2013.01); G05D 1/0221 (2013.01)

(58) Field of Classification Search
CPC ...... B25J 9/1666; B25J 9/1676; B25J 9/1697; B25J 19/022; B25J 19/023; B25J 5/007; B25J 11/008; G05D 1/0214; G05D 1/0238; G05D 1/0248; G05D 1/0274; G05D 1/0221
See application file for complete search history.

(56) References Cited

U.S. PATENT DOCUMENTS

| | | | |
|---|---|---|---|
| 2007/0193798 A1 | 8/2007 | Allard et al. | |
| 2017/0010618 A1* | 1/2017 | Shashua | G01C 21/3602 |
| 2017/0053169 A1* | 2/2017 | Cuban | G06V 20/53 |
| 2018/0204111 A1* | 7/2018 | Zadeh | G06N 3/0436 |
| 2019/0051155 A1* | 2/2019 | Yamaguchi | G08G 1/0965 |
| 2020/0097014 A1* | 3/2020 | Wang | G06Q 10/047 |
| 2020/0254876 A1* | 8/2020 | Cordell | G06V 20/56 |
| 2020/0380278 A1* | 12/2020 | Kim | G06T 7/70 |
| 2021/0061269 A1* | 3/2021 | Petroff | G05D 1/0088 |
| 2021/0089788 A1* | 3/2021 | Engle | G08G 1/0137 |
| 2021/0239785 A1* | 8/2021 | Suzaki | G01S 5/0278 |

(Continued)

*Primary Examiner* — Abby Y Lin
*Assistant Examiner* — Sohana Tanju Khayer
(74) *Attorney, Agent, or Firm* — Ked & Associates LLP

(57) ABSTRACT

Disclosed herein are a method of identifying a dynamic obstacle and a robot implementing the same, wherein the robot configured to identify a dynamic obstacle may change mechanisms for identifying an obstacle in an image captured by a camera sensor in a first direction and for sensing the obstacle on the basis of a velocity of movement of the identified obstacle, a degree of congestion based on distribution of the obstacle and a velocity of movement of the robot, to generate a moving path of the robot.

20 Claims, 16 Drawing Sheets

(56) References Cited

U.S. PATENT DOCUMENTS

| | | | |
|---|---|---|---|
| 2021/0370511 A1* | 12/2021 | Hong | A47L 11/4061 |
| 2022/0063096 A1* | 3/2022 | Ju | B25J 9/1664 |
| 2022/0281106 A1* | 9/2022 | Higashi | B25J 9/1661 |

* cited by examiner

◉ : OBSTACLE

◐ : SENSING RANGE OF AUXILIARY SENSOR

▽ : FOV OF CAMERA SENSOR

65

66

○ : CAMERA SENSOR

▽ : FIELD OF VIEW

→ : DIRECTION OF CAMERA SENSOR

METHOD OF IDENTIFYING DYNAMIC OBSTACLE AND ROBOT IMPLEMENTING SAME

CROSS-REFERENCE TO RELATED APPLICATION

This application claims priority to and the benefit of Korean Patent Application No. 10-2019-0147137, filed in Korea on Nov. 15, 2019, the disclosure of which is incorporated herein by reference in its entirety.

BACKGROUND

1. Field

The present disclosure relates to a method of identifying a dynamic obstacle and a robot implementing the same.

2. Background

A large-scale retail store, a department store, an airport, a golf course, and the like are places where exchange of goods and services takes place between people. Robots may be useful in the places to offer information or convenience to people.

Robots may be classified as guide robots, security robots, cleaning robots and the like. They move in a space, confirming their positions.

They may use a mechanism for sensing an obstacle to avoid their collision with a person or an object while moving. In case they sense an obstacle in an indoor space where a large number of people move or in an outdoor space of a large area, frequent movements of people and objects interfere with processes in which they sense an obstacle and move.

As a means to solve the above-described problem, an increased number of sensors or various types of sensors may be used for the robots. This results in an increase in calculation of the robots and a lower velocity of movement of the robots.

In the disclosure, a method by which the robots efficiently recognize a dynamic obstacle is described.

SUMMARY

According to the present disclosure, a robot may overcome viewing angle limitations when identifying an obstacle using a camera sensor.

According to the present disclosure, the robot may confirm movements or an arrangement state of obstacles using the camera sensor and an auxiliary sensor such that the robot moves while avoiding the obstacles.

According to the present disclosure, the robot may apply a position of obstacles or a velocity of movement of obstacles acquired at a first time point to a local map and may move using the same at a second time point.

The objects of the present disclosure are not limited to the above-mentioned objects, and the other objects and advantages of the present disclosure, which are not mentioned, may be understood by the following description, and more clearly understood by the embodiments of the present disclosure. It is also readily understood that the objects and the advantages of the present disclosure may be implemented by features described in appended claims and a combination thereof.

A robot that identifies a dynamic obstacle according to an embodiment may change mechanisms for identifying an obstacle in an image captured by a camera sensor in a first direction and for sensing the obstacle on the basis of a velocity of movement of the identified obstacle, a degree of congestion based on distribution of the obstacle and a velocity of movement of the robot, to generate a moving path of the robot.

The robot that identifies a dynamic obstacle according to an embodiment may store information on a velocity of movement of a first dynamic obstacle and a first static obstacle identified in a captured image.

The robot that identifies a dynamic obstacle according to an embodiment may calculate position uncertainty of the first dynamic obstacle and a position of the first static obstacle, using an image captured in a second direction partially overlapping the first direction, a difference of the first direction and second direction and the stored information.

The robot that identifies a dynamic obstacle according to an embodiment may calculate an obstacle sensing range using the velocity of movement of the robot and time taken by the camera sensor to capture an image in a all direction or a direction of movement, and may calculate whether the first dynamic obstacle is included in the obstacle sensing range to adjust a shooting direction of the camera sensor or to change the direction of movement of the robot.

The robot that identifies a dynamic obstacle according to an embodiment may apply a velocity of a dynamic obstacle near the robot to calculate position uncertainty, and, when the uncertainty is at a predetermined level or above, the camera sensor photographs the dynamic obstacle such that the robot recalculates uncertainty.

The robot that identifies a dynamic obstacle according to an embodiment may calculate distribution of obstacles disposed in a direction of movement of the robot or a degree of congestion to which velocities of the obstacles are applied and, when the degree of congestion is at a level or above, may adjust the shooting direction of the camera sensor towards a heavily congested area.

A method of identifying a dynamic obstacle according to an embodiment may include embodiments for controlling operations of the above-described robot.

According to the embodiments, a robot may overcome viewing angle limitations and may identify an obstacle in a wide area when identifying the obstacle using a camera sensor.

According to the embodiments, the robot may confirm movement or arrangement of obstacles using the camera sensor and an auxiliary sensor to avoid the obstacles. To this end, a viewing angle range of the camera sensor and a sensing range of the auxiliary sensor may be combined.

According to the embodiments, the robot may apply positions or velocities of movements of a wide range of obstacles to a local map using the camera sensor and, on the basis of the local map, may set a moving path of the robot.

The effect of the present disclosure is not limited to the above-mentioned effect, and those skilled in the art of the present disclosure may easily understand various effects of the present disclosure based on the disclosure of the present disclosure.

BRIEF DESCRIPTION OF THE DRAWINGS

The accompanying drawings constitute a part of this specification, illustrate one or more embodiments of the present disclosure, and together with the specification, explain the present disclosure, wherein.

DETAILED DESCRIPTION

Figure 1:
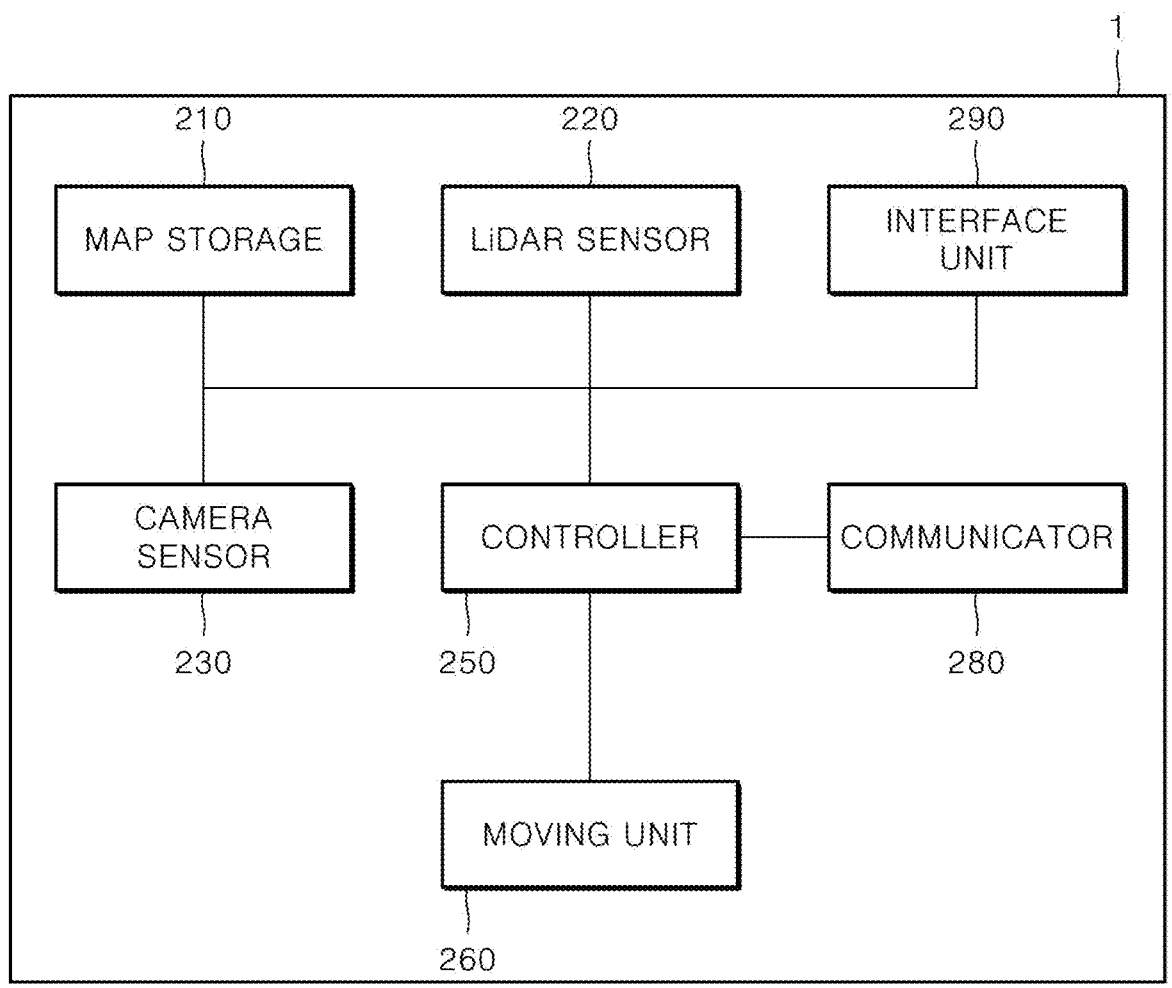
FIG. 1 illustrates a configuration of a robot according to an embodiment.

Hereinafter, exemplary embodiments of the present disclosure will be described in detail with reference to the accompanying drawings so that they can be easily practiced by those skilled in the art. The present disclosure may be embodied in many different manners and should not be construed as being limited to the embodiments set forth herein.

In some exemplary embodiments, portions irrelevant to the description of the present disclosure will be omitted for clarity. Moreover, same or similar elements are designated by a same reference numeral throughout the present disclosure. Also, some embodiments of the present disclosure will be described in detail with reference to the accompanying drawings. In adding reference numerals to elements in each figure, it should be noted the same elements will be designated by the same reference numerals, if possible, even though they are shown in different drawings. Further, in the following description of the present disclosure, a detailed description of known functions or configurations incorporated herein will be omitted when it is determined that the description may make the subject matter of the present disclosure rather unclear.

In some exemplary embodiments, terms such as first, second, A, B, (a), (b) and the like may be used herein when describing the elements of the present disclosure. These terms are intended to distinguish one element from other elements, and the essence, order, sequence, or number of corresponding elements is not limited by these terms. It should be understood that when any one element is described as being "connected," "combined," or "coupled" to another element, they may be connected, combined, or coupled to each other directly or with an intervening element therebetween.

Further, one element may be described as its sub-elements in implementing the present disclosure; however, the sub-elements may be implemented in a single device or module in an integrated manner or implemented in multiple devices or modules in a distributed manner.

This work was supported by the ICT R&D program of MSIT/IITP [2017-0-00306, Development of Multimodal Sensor-based Intelligent Systems for Outdoor Surveillance Robots]

Hereinafter, devices that follow the user and move autonomously or move based on electrical energy under the control of the user are referred to as a "smart cart robot", a "cart robot", a "delivery robot" or a "robot". The robot may be used in stores such as large marts and department stores. Alternatively, users may use the robot in a space where many travelers move, such as airports or harbors. Robots may also be used in leisure spaces such as golf courses.

In some exemplary embodiments, the robot may move automatically while goods are loaded onto the robot or may move under the control of the user in container logistics centers or factories. Alternatively, the robot may transport patients or drugs in spaces such as hospitals.

According to the present disclosure, the robot may refer to a machine that automatically processes or operates a given work with capability of the robot. In particular, a robot that performs a function for recognizing environment, determining the state by itself, and operating operation of the robot may be referred to as "an intelligence robot".

Robots may be classified into industrial robots, medical robots, household robots, military robots, and the like, according to purpose or field of use.

The robot may include a moving unit. The moving unit includes an actuator or a motor to perform various types of physical operations such as moving a robot joint. In some exemplary embodiments, the movable robot includes the moving unit and the moving unit includes a wheel, a brake, a propeller, and the like, and may travel on the ground or fly in the air using the moving unit.

In some exemplary embodiments, the robot may include a predetermined accommodator and may move while following the user.

The robot may also perform autonomous driving. Autonomous driving refers to a self-driving technology, and the autonomous robot travels without user's manipulation or with minimum level of manipulation of the user.

For example, autonomous driving may include technology for maintaining a distance to other obstacles in a driving space of the robot, technology for automatically adjusting a velocity of the robot such as adaptive cruise control, technology for automatically travelling along a predetermined path of a robot, and technology for automatically setting a route of the robot when a destination of the robot is set.

The robot may include an internal combustion engine or an electric motor for autonomous driving.

In an exemplary embodiment, the robot includes all types of apparatuses that trace position of the user to follow the user having a predetermined storage space. The storage space may load things, or human may ride on the storage space for a moment. Further, the robot includes all types of devices that move based on the electric power under the control of a user, for example, pushing or pulling. As a result, the user may move the robot without controlling the robot. The user may also move the robot with a less magnitude of force.

In this specification, robots may be used for specific purposes (cleaning, security, monitoring, guiding and the like) or may include a moving device that may move while offering functions based on features of spaces where the robots move. Accordingly, devices that may be provided with a moving means configured to move using predetermined information and using a sensor and that may offer predetermined functions may be collectively referred to as the robots set forth herein.

FIG. 1 illustrates a configuration of a robot according to an embodiment. In an embodiment, a robot may be provided with a sensor that senses a distance between an external object and the robot. A LiDAR sensor is described as the sensor. The LiDAR sensor, however, may be an example of sensors provided to the robot. The sensors may include an ultrasonic sensor, an infrared sensor, a laser sensor, a time-of-flight (TOF) sensor and the like. In this specification, the LiDAR sensor may be replaced with other sensors, and other sensors may be included in the embodiments presented in the present disclosure.

A map storage 210 may store a space where the robot moves as a map. The map storage 210 may store position information on a fixed obstacle, position information on another robot and the like. The robot may optionally store position information on a dynamic obstacle for a limited period in the map storage 210.

A LiDAR sensor 220 may sense surrounding objects two-dimensionally or three-dimensionally. A two-dimensional LiDAR sensor may sense positions of objects within 360-degree ranges with respect to the robot. LiDAR information sensed in a specific position may constitute a single LiDAR frame. That is, the LiDAR sensor 220 senses a distance between an object disposed outside the robot and the robot to generate a LiDAR frame.

In an exemplary embodiment, a camera sensor 230 may be a regular camera. To overcome viewing angle limitations, two or more camera sensors 230 may be used. An image captured in a specific position constitutes vision information. That is, the camera sensor 230 photographs an object outside the robot and generates a visual frame including vision information.

The camera sensor 230 may be disposed at the robot 1, and its shooting direction may be adjusted. The shooting direction means the photographing direction of camera. As the camera sensor has a limited viewing angle, the camera sensor captures an image within a limited viewing angle range towards a first direction. When a controller 250 adjusts the shooting direction of the camera sensor to a second direction, the camera sensor captures an image within a limited viewing angle range towards the second direction. Alternatively, the camera sensor may capture an image while the direction is changed.

The robot 1, to which the present disclosure is applied, performs fusion-simultaneous localization and mapping (Fusion-SLAM) using the LiDAR sensor 220 and the camera sensor 230.

In fusion SLAM, LiDAR information and vision information may be combinedly used. The LiDAR information and vision information may be configured as maps.

A moving unit 260 is a component that moves the robot like a type of wheels. The controller 250 may control the moving unit 260 to move the robot.

In a state in which a plurality of the robots in FIG. 1 is disposed in a service space, the robots perform specific functions (guide services, cleaning services, security services and the like). In the process, the robot 1 may store information on its position, may confirm its current position in the entire space, and may generate a path required for moving to a destination.

An interface unit 290 receives information input by a user. The interface unit 290 receives various pieces of information such as a touch, a voice and the like input by the user, and outputs results of the input. Additionally, the interface unit 290 may output a map stored by the robot 1 or may output a course in which the robot moves by overlapping on the map.

Further, the interface unit 290 may supply predetermined information to a user.

A communicator 280 may allow the robot 1 to communicate with another robot or an external server and to receive and transmit information.

The robot 1 may generate each map using each of the sensors (a LiDAR sensor and a camera sensor), or may generate a single map using each of the sensors and then may generate another map in which details corresponding to a specific sensor are only extracted from the single map.

The moving unit 260 may offer information on a rotation or a velocity, a direction and the like of the wheels, which is generated during movement of the robot, to the controller 250. The controller 250 may confirm a current position of the robot using sensor or map. Further, the controller may accurately calculate the current position of the robot by applying information on a physical travel distance offered by the moving unit 260.

The controller 250 may generate a moving path of the robot using information stored in the map storage 210, position information of a sensed obstacle and the like. In this process, the controller 250 may identify a dynamic obstacle using the camera sensor 230. The camera sensor 230 may acquire an external image in a situation where the LiDAR sensor 220 may not sense external obstacles.

In case more camera sensors 230 are installed at the robot, or a viewing angle (Field of View or FOV) of each camera sensor 230 is wider, the camera sensor 230 may photograph a wider area.

Accordingly, in case the number of camera sensors 230 installed at the robot 1 is decreased or a wider area is photographed with a camera sensor 230 having a narrow viewing angle, economic efficiency of the robot may be increased.

To this end, the robot 1 may move the camera sensor 230 dynamically or may carry out processes such as a prediction of a position of an obstacle. By doing so, the robot 1 may photograph a wide area using a small number of camera sensors or a camera sensor having a narrow viewing angle.

That is, the controller 250 may identify an obstacle in an image that is photographed by the camera sensor 230 in a first direction. Additionally, the controller 250 may change a mechanism for sensing an obstacle and may generate a moving path of the robot on the basis of a velocity of movement of the identified obstacle, a degree of congestion based on distribution of the obstacle and a velocity of movement of the robot.

That is, the controller 250 may use a velocity of movement of an identified obstacle, a degree of congestion based on distribution of the obstacle, and a velocity of movement of the robot when changing a mechanism for sensing an obstacle.

Further, the controller 250 may use a velocity of movement of an identified obstacle, a degree of congestion based on distribution of the obstacle, and a velocity of movement of the robot when generating a moving path of the robot.

A velocity and a direction where the camera sensor photographs an obstacle such that the controller 250 senses the obstacle may be examples of the mechanism for sensing an obstacle.

Further, a velocity of movement of the robot to allow the controller 250 to sense an obstacle may be an example of the mechanism for sensing an obstacle. Furthermore, a travel path or a travel direction of the robot, which is set to improve accuracy of sensing an obstacle by the controller 250, may be an example of the mechanism for sensing an obstacle.

A change made by the controller 250 in a velocity and direction where the camera sensor photographs an obstacle to improve accuracy of sensing the obstacle may be an example of a change in the mechanism for sensing an obstacle.

Further, a change made by the controller 250 in a velocity of movement of the robot to improve accuracy of sensing an obstacle may be an example of a change in the mechanism for sensing an obstacle.

Furthermore, a change made by the controller 250 in a travel path or a travel direction of the robot to improve accuracy of sensing an obstacle may be an example of a change in the mechanism for sensing an obstacle.

In an exemplary embodiment, the controller 250 of the robot may determine a shooting direction (i.e., photographing direction) of the camera sensor 230 and may generate a moving path of the robot using time taken to change the shooting direction of the camera sensor. Accordingly, a photography velocity may also be changed or newly set. A process of calculating a velocity of movement may include calculating a direction and a speed of movement of an obstacle. Time taken to change the direction of the camera sensor 230 and to capture an image in another direction in case the direction of the camera sensor is fixed when the camera sensor 230 captures an image may be an example of the time taken to change the shooting direction of the camera sensor. Alternatively, time taken by the camera sensor to rotate to capture an image in another direction in case the direction of the camera sensor is changed while the camera sensor 230 captures an image may be an example of the time taken to change the shooting direction of the camera sensor.

Time taken by the camera sensor 230 to capture an image in a following direction may include mechanical time. Further, on the basis of a direction photographed by the camera sensor 230, the time may be changed.

In addition, the velocity of movement of the robot may be applied to setting a shooting direction of the camera or to generating a moving path of the robot. In case the robot moves slowly, there may be no big difference in surroundings of the robot due to a low velocity of movement of the robot itself. Accordingly, the shooting direction of the camera sensor 230 may not be frequently changed. In this case, the controller 250 may determine the shooting direction of the camera sensor 230 or may set a method of changing the shooting direction (a photography mechanism) in accordance with the low velocity of movement of the robot.

Conversely, in case the robot moves fast, there may be a big difference in surroundings of the robot due to a high velocity of movement of the robot itself. Accordingly, the shooting direction of the camera sensor 230 may be frequently changed. In this case, the controller 250 may determine the shooting direction of the camera sensor 230 or may set a method of changing the shooting direction (a photography mechanism) in accordance with the high velocity of movement of the robot.

The method of changing a shooting direction of a camera may vary depending on a camera sensor (a still camera) that fixes a shooting direction, captures an image and then changes the shooting direction, and depending on a camera sensor (a moving camera) that captures an image while dynamically changing a shooting direction.

In an exemplary embodiment, when setting a shooting direction of a fixed-direction-photography-type camera sensor (a still camera), the controller 250 may set an optimal direction of the camera sensor on the basis of time taken by the camera sensor to capture an image and on the basis of time taken to change the shooting direction of the camera in a direction an obstacle may continue to be sensed.

In an exemplary embodiment, when setting a shooting direction of a changed-direction-photography-type camera sensor (a moving camera), the controller 250 may compare time taken by the camera sensor to capture an image with a changed direction and a viewing angle range while the camera sensor captures an image to set an optimal direction of the camera sensor. The above description may also be applied to other sensors for sensing an obstacle such as a LiDAR sensor and the like in addition to the camera sensor. Further, changing the mechanism for sensing an obstacle may include adjusting a velocity of movement of the robot such that the velocity of movement of the robot is adequate for sensing an obstacle. In an exemplary embodiment, in case a dynamic obstacle is highly likely to appear frequently or in case a dynamic obstacle is highly likely to appear on a travel path of the robot, the controller 250 of the robot may reduce the velocity of movement of the robot to sense an obstacle quickly.

In an exemplary embodiment, the controller 250 may apply time taken by the camera sensor to photograph an external obstacle and to identify the obstacle when controlling the velocity of movement of the robot.

Further, changing the mechanism for sensing an obstacle may include setting a travel path or a travel direction of the robot. For example, in case dynamic obstacles are highly likely to appear from the left, the controller 250 of the robot may control movement of the robot further towards the right than a primary travel path to sense the obstacles rapidly. Alternatively, the controller 250 may control the travel direction such that the robot is spaced and moved apart from the left area to effectively avoid the dynamic obstacles appearing from the left.

The mechanism for sensing an obstacle may include a mechanism for controlling sensors or a travel method such that the robot does not collide with obstacles, which may not be rapidly confirmed by the robot, such as a dynamic obstacle or a static obstacle that may be confirmed by the robot only when the robot approaches to the static obstacle, even when the obstacles appear. The mechanism may be changed on the basis of distribution of obstacles and a velocity of movement of obstacles and the like.

Figure 2:
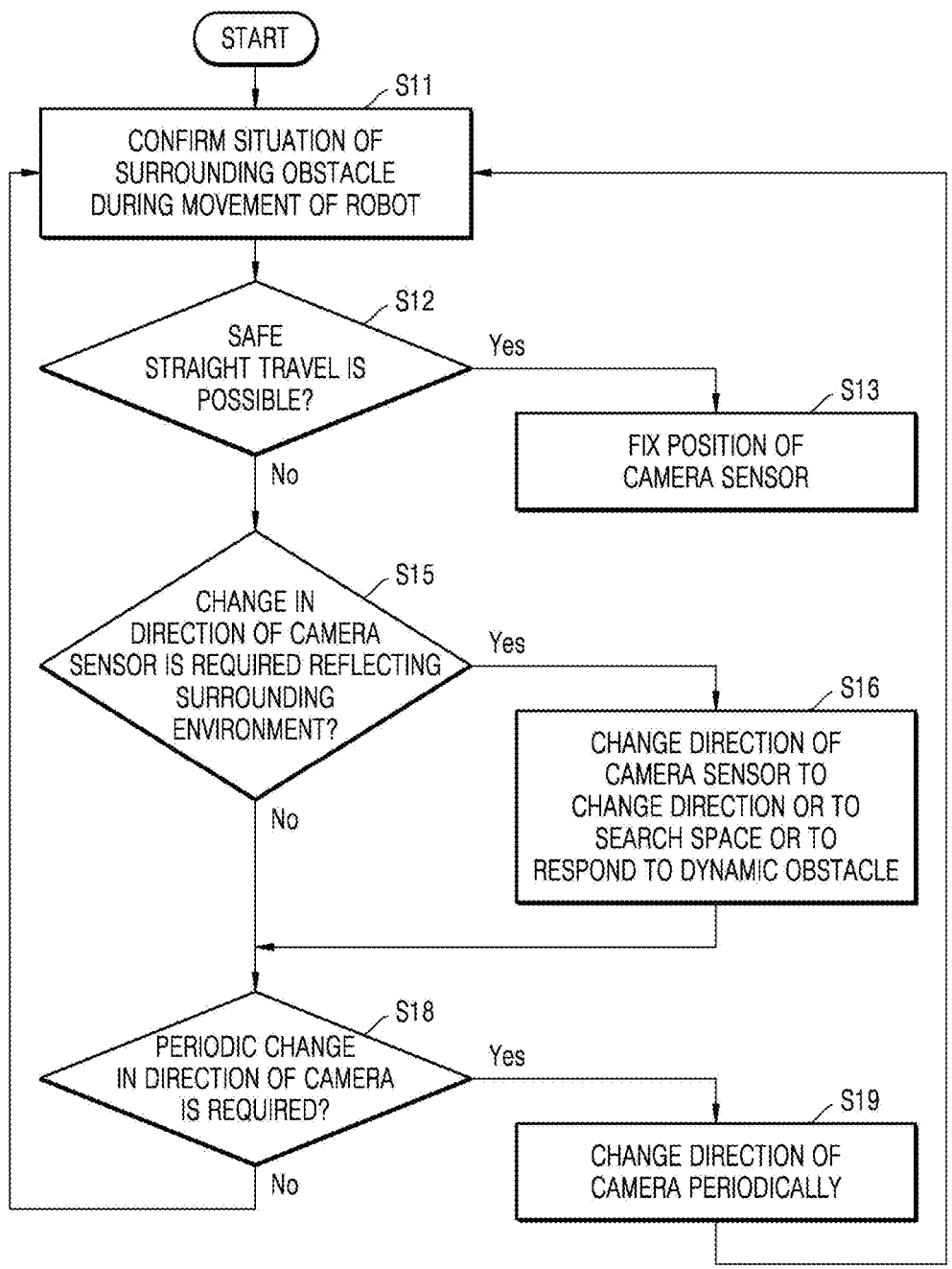
FIG. 2 illustrates a process in which a robot controls movement of a camera sensor according to an embodiment.

FIG. 2 illustrates a process in which a robot controls movement of a camera sensor according to an embodiment.

While moving, the robot may confirm a situation of a surrounding obstacle (S11), and on the basis of the confirmation, may move or fix a camera sensor. In FIG. 2, the controller 250 controls the camera sensor 230 in three modes.

First, the controller 250 may determine the following situations on the basis of values (a visual frame, a LiDAR frame and the like) that are previously sensed. The controller 250 may confirm whether there is any change in an obstacle or other objects in a direction of movement of the robot moves. Alternatively, the controller 250 may confirm whether there is a threatening obstacle within a detection range of a sensor in a direction where the robot moves. Alternatively, the controller 250 may confirm whether an avoidance path of the robot can be estimated in a current FOV as there are a small number of obstacles in a direction of movement or within a range where the robot moves.

In any one or more of the above-described situations, the controller 250 may determine that the robot can travel straight ahead safely (S12) and may fix a position of the camera sensor 230 (S13). This is to allow the camera sensor 230 to continue to capture an image in the direction of movement and to allow the controller 250 to avoid an obstacle or to set a moving path of the robot using the captured image, i.e., a visual frame.

Next, in case the answer is "No" in S12, the controller 250 may determine that a direction of the camera needs to be changed as a result of determination as to whether the direction of the camera needs to be changed (S15) considering a surrounding environment.

Next, in case the answer is "Yes" in S15, three mechanisms for changing a direction of the camera sensor is classified as S16. The three mechanisms involve i) a response mechanism for changing a direction, ii) a response mechanism for searching a space, and iii) a response mechanism for position uncertainty about a dynamic obstacle.

In an exemplary embodiment, the controller 250 may perform a response mechanism for changing a direction. When the robot has to change its direction to reach a destination, the controller 250 may first move the camera sensor 230 in a direction headed by the robot. In an exemplary embodiment, the controller 250 may rotate the camera sensor 230 such that the camera sensor captures an image in a direction headed by the robot. That is, in case the robot that moves forwards changes its direction to the left, the controller 250 controls the camera sensor 230 such that the camera sensor 230 faces the left.

Thus, the controller 250 may confirm an obstacle that likely collides with the robot on a predicted moving path of the robot using the camera sensor 230 that has changed its direction. In case the controller 250 determines that there is no obstacle, the controller 250 may change the direction of the robot in accordance with the predicted moving path such that the robot 1 travels along the predicted moving path.

In case the controller 250 determines that there is an obstacle, the controller may estimate a new path of the robot using the camera sensor 230 or the LiDAR sensor 220 and the like by additionally applying information on the obstacle. Additionally, the controller 250 may move the camera sensor 230 in the newly estimated direction and may repeat confirming whether there is an obstacle.

In an exemplary embodiment, the controller 250 may perform a response mechanism for searching a space. The controller 250 may calculate a range where the robot may detect an obstacle while moving, on the basis of a velocity (v) of the robot and turnaround time (t) of the camera sensor 230. In an exemplary embodiment, the velocity (v) may be set to m/sec, and the turnaround time (t) may be set to seconds.

For example, a range moved by the robot within time "t" may be calculated using formula "v*t+alpha". The camera sensor 230 may photograph an entire range or a range of a direction of movement during time "t".

In the formula, alpha denotes an additional margin. The controller 250 determines where there is a dynamic obstacle or whether a predicted value is at a predetermined level or higher, within an obstacle sensing range. The predicted value is a value of the possibility that there is a dynamic obstacle within the obstacle sensing range. Certainly, the controller 250 may also sense a static obstacle within the obstacle sensing range.

Additionally, the controller 250 searches a direction different from the direction where the robot has moved so far such that the robot moves to a new space that is not confirmed yet, in case a path, on which the robot may avoid the obstacle, is not estimated. When the controller 250 determines a direction (an angle) to be searched, the controller 250 may control rotation of the robot considering the following details.

The controller 250 may place a weight on a direction that does not overlap with a moving path of a dynamic obstacle when the robot rotates. Alternatively, the controller 250 may place a weight on a direction that is close to a moving path to a destination among directions that do not overlap with a moving path of a dynamic obstacle.

In one embodiment, the controller 250 may carry out a mechanism for responding to uncertainty about a position of a dynamic obstacle. In case uncertainty about a predicted position of an obstacle is a predetermined value or higher, the controller 250 reconfirms a position of the obstacle by rotating the camera sensor 230 towards the obstacle to reduce the uncertainty about the position.

The controller 250 may determine the uncertainty about the position of the obstacle in proportion to "velocity of an obstacle/passage of estimated time". The controller 250 determines that uncertainty about a fast obstacle which moves fast in short time as high.

The controller 250 proceeds to S18 after S16. Alternatively, the controller 250 may proceed to S11 in case the robot may move, or in case the robot is unlikely to collide with a dynamic obstacle as a result of three conversion mechanisms in S16.

In S18, the controller 250 may determine that a direction of the camera sensor 230 needs to be changed regularly. When the direction of the camera sensor 230 needs to be changed as a result of the determination, the controller 250 regularly changes the direction of the camera (S19).

The controller 250 may change the direction of the camera sensor 230 in two cases. First, assume that the robot 1 is isolated and surrounded by dynamic obstacles. This is the case where there is no more new space after the mechanism for searching a space is carried out in S16.

That is, in case the robot 1 is surrounded by dynamic obstacles in all directions although the controller 250 confirms all movable and confirmable directions using the camera sensor 230, the controller 250 may determine that it is impossible to estimate an avoidable path of the robot. In some embodiments, the controller 250 may regularly change the direction of the camera sensor 230 to monitor a change in situations of the dynamic obstacles. In this process, when the dynamic obstacle moves farther away from the robot, the controller 250 may generate a new path.

Next, in case the robot 1 is highly likely to collide with another dynamic obstacle, the controller 250 may change the direction of the camera sensor 230 on a regular basis. In case a dynamic obstacle can appear suddenly although there is no visible threat of collision in the detection range, the controller 250 may monitor whether a dynamic obstacle appears while changing the direction of the camera sensor 230 on a regular basis. This is the case where the robot 1 moves on a road for vehicles where a velocity limit is high. In this case, the controller 250 may determine a situation of the travel path using a semantic segmentation process and the like and may operate differently on the basis of whether the path is a road or a sidewalk.

The flow in FIG. 2 is described as follows. The controller 250 may identify an obstacle in an image captured by the camera sensor 230, may determine whether there is no dynamic obstacle near a moving path of the robot or whether a dynamic obstacle becomes far away from a moving path as a result of the identification, and may confirm the dynamic obstacle does not affect movement of the robot on the moving path. Additionally, the robot 250 controls the camera sensor 230 such that the camera sensor 230 is fixed in a direction of movement of the robot while the controller 250 moves the robot along the moving path (S12 and S13).

In case the moving path of the robot needs to be corrected due to movement of the dynamic obstacle or a placement of a new static obstacle and the like in S12, the controller 250 may determine an adjustment of the direction of the camera sensor to a direction except the direction of the moving path to generate another moving path (S16 and S19).

Figure 3:
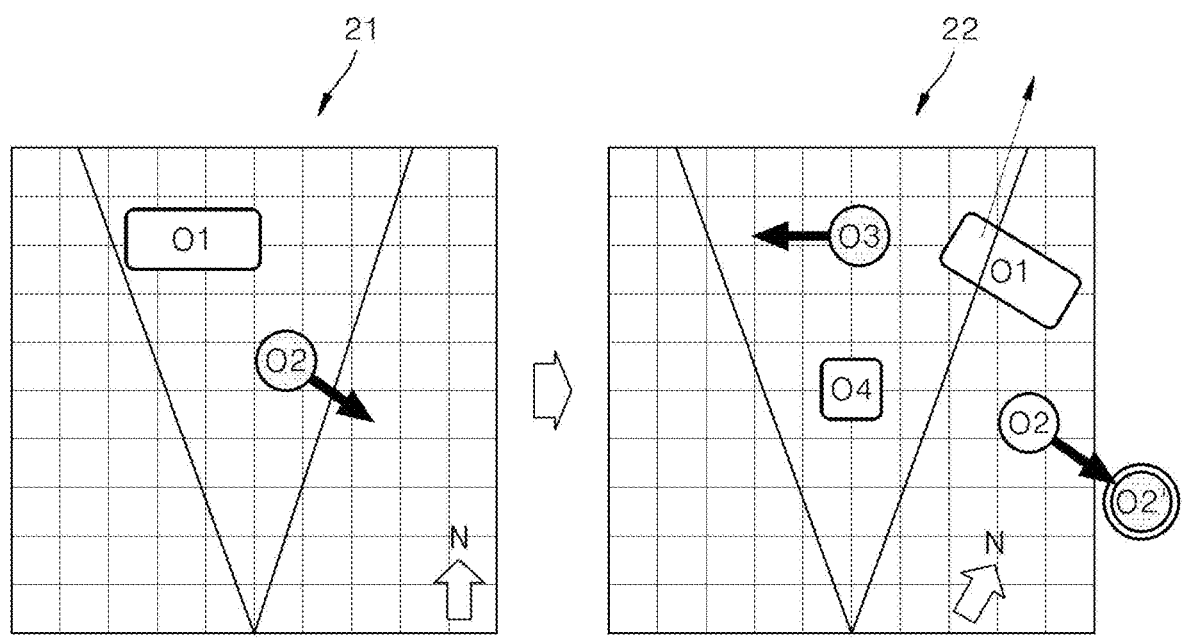
FIG. 3 illustrates a process of estimating position uncertainty of an obstacle at the time of a change in directions according to an embodiment.

FIG. 3 illustrates a process of estimating position uncertainty of an obstacle at the time of a change in directions according to an embodiment.

Reference No. 21 indicates an example where two obstacles (O1 and O2) are sensed within a viewing angle of the camera sensor 230 in case the robot is headed north (N). Obstacle O1 is a static obstacle and does not move. Obstacle O2 is a dynamic obstacle that moves in a direction of the arrow (i.e., the south east direction). When such obstacles are placed, the direction of the robot or the direction of the camera sensor 230 may be changed such the robot avoids the obstacles.

For example, reference No. 22 indicates that the robot or the camera sensor 230 rotates to the left and faces the north west. In this case, obstacle O1 in 21 is partially outside a viewing angle range of the camera sensor 230 and a new static obstacle of O4 and a new dynamic obstacle of O3 are sensed. The controller 250 may calculate a distance moved by O2 with respect to O2 sensed in 21.

That is, the controller 250 may store information on the position of O2 and the velocity and direction of movement of O2 confirmed in 21. In 22, although O2 is not sensed by the camera sensor 230, a result of a change in the position of O2 to O2' may be calculated. The result of the change in the position is calculated by the controller 250 using a difference in time between 22 and 21, and the velocity and direction of movement of O2.

The controller 250 may calculate a change in the position of O2 to O2' and may estimate position uncertainty about the obstacle. That is, the controller may calculate a difference (signma) in the positions of obstacle O2 in proportion to magnitude (an angle) of rotation from reference no. 21 reference no. 22 and in proportion to a difference between periods in reference no. 21 and reference no. 22, and may generate a Gaussian distribution where the difference is increased and estimate position uncertainty about the obstacle.

In case obstacle O2 moves slowly, position uncertainty about O2 may be low. In case obstacle O2 moves fast, position uncertainty about O2 may be high.

The controller 250 may update the probability that there is an obstacle on the basis of the position and size and the like of O1 in 22 on the basis of the position and size confirmed in 21 although O1 sensed in 21 is partially outside the viewing angle. That is, the controller 250 may confirm O1 is the same as O1 in 21 although only a very small part of O1 is sensed in 22, and on the basis of results of the confirmation, may calculate another part of O1 is outside the viewing angle although a very small part of O1 is sensed in 22.

In case the robot rotates to the left again with respect to 22, O1 and O2 do not affect the direction of movement of the robot. Accordingly, the controller 250 may stop estimating position uncertainty about O1 and O2. Alternatively, the controller 250 may place less importance on O1 and O2.

FIG. 3 illustrates that although the viewing angle of the camera sensor 230 is changed in 21 as in 22, the controller may confirm a direction and a speed of movement of the dynamic obstacle outside the viewing angle range as the controller 250 stores information on a velocity of movement of the dynamic obstacle and on the static obstacle identified in the image. The controller 250 may also recalculate a position of the static obstacle.

That is, the controller 250 may calculate position uncertainty of the dynamic obstacle and the position of the static obstacle using an image photographed in a second direction (the north west in 22) that partially overlaps with a first direction (the north in 21), a difference between the first direction and the second direction, and the previously stored information.

The position uncertainty about a dynamic obstacle is based on results of calculation performed by the controller 250 of points, where a dynamic obstacle may be positioned after a predetermined period, using a velocity of the dynamic obstacle. As a result of calculations performed by the controller 250, when there are a large number of predicted candidate points where dynamic obstacles may be disposed, the position uncertainty about the dynamic obstacle is high.

In case a dynamic obstacle makes no uniform motion or often changes its direction and the like, position uncertainty about the dynamic obstacle becomes high. Accordingly, high position uncertainty about the dynamic obstacle greatly affects movement of the robot. In case position uncertainty about a dynamic obstacle is high, the controller 250 may correct the moving path.

The controller 250 may apply positions of a dynamic obstacle and a static obstacle to a local map of the map storage 210. In this case, the controller 250 may set a period during which the position of the dynamic obstacle is stored to a short period such that the position of the dynamic obstacle is automatically deleted from the local map after a predetermined period.

When using 21 and 22 in FIG. 3, the robot may distinguish the static obstacle from the dynamic obstacle. Description in relation to this is provided hereunder.

Figure 4:
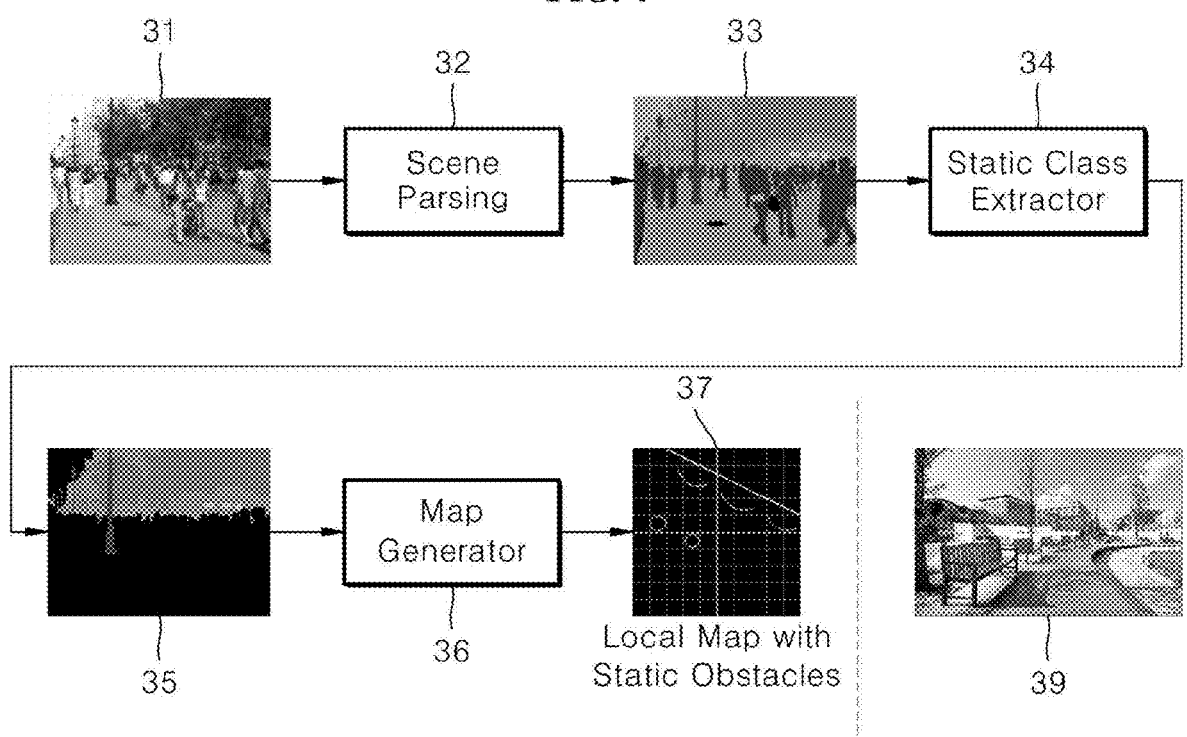
FIG. 4 illustrates a process of selecting a static obstacle according to an embodiment.

FIG. 4 illustrates a process of selecting a static obstacle according to an embodiment.

Reference No. 31 indicates an image of surroundings of the robot captured by the camera sensor 230. An image may be captured one or more times in the same direction. In case the camera sensor 230 captures images two or more times at temporal intervals, a dynamic obstacle may be readily distinguished.

The controller 250 performs scene parsing (32). The controller 250 may apply a feature map or a deep learning network or global pooling or pyramid scene parsing and the like to the image 31 to determine a relationship between objects in the image.

As a result, the controller 250 produces results of the scene parsing as in 33. Additionally, the controller 250 applies a static class extractor 34 to extract static objects from the image as in 35. Then the controller 250 applies a map generator 36 to generate a local map with static obstacles as in 37.

The controller 250 may display static obstacles that may not be detected by a two-dimensional LiDAR sensor on the map, as in 39 showing benches.

In summary, the controller 250 of the robot analyzes a scene in the input image 31 and calculates a relationship between objects in the image (33). Additionally, the controller 250 determines a static level of the objects in the image and extracts the static obstacles, and, on the basis of the static level, generates a map.

Then the robot 1 may confirm surrounding static obstacles using the generated local map.

Figure 5:
FIG. 5 illustrates results of identification and a trace of dynamic obstacles by a controller according to an embodiment.

FIG. 5 illustrates results of identification and a trace of dynamic obstacles by a controller according to an embodiment.

In an exemplary embodiment, the controller 250 may identify a person who is a dynamic object in an image 41 captured at a first time point. Further, the controller 250 may identify a dynamic object in an image 42 captured at a second time point at temporal intervals of T (e.g., one second) with respect to the first time point. Each of the identified objects is identified as "id=###".

As another example, the controller 250 of the robot 1 may identify objects that are identical but have different positions in the images of 41 and 42 captured at the time intervals of T and then may give an identification number to each of the objects.

Additionally, the controller 250 may confirm movements of the objects that are given the identification number by capturing an image.

Figure 6:
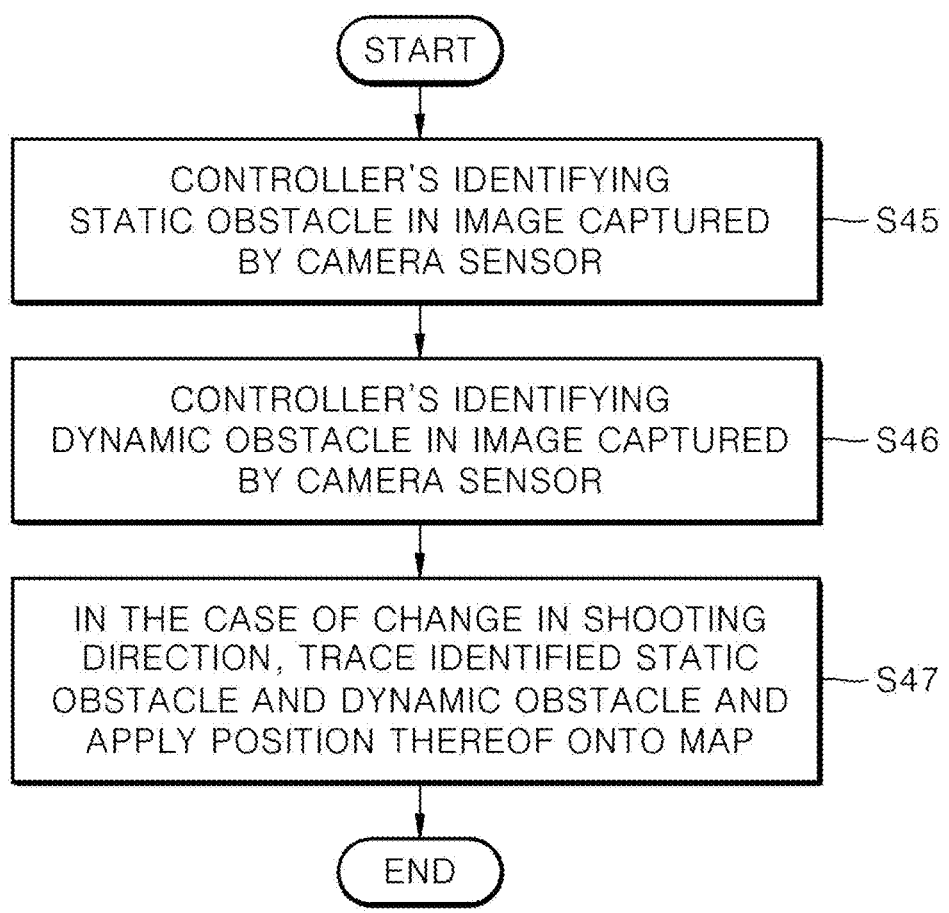
FIG. 6 illustrates a process of identifying an obstacle in an image by a controller according to an embodiment.

FIG. 6 illustrates a process of identifying an obstacle in an image by a controller according to an embodiment. The controller 250 may identify a static obstacle in an image captured by the camera sensor 230 (S45). The controller 250, as described with reference to FIG. 4, may identify a static obstacle in the image through scene parsing and using a static class extractor.

Next, the controller 250 may identify a dynamic obstacle in the image captured by the camera sensor 230 (S46). The controller 250, as described with reference to FIG. 5, may add identification information to an object where there is a difference between two or more images that are captured at temporal intervals. Alternatively, the controller 250 may determine that the rest objects except the static obstacle in the same image are dynamic obstacles.

Then the controller 250 may store information on the static obstacle and the dynamic obstacle acquired in S45 and S46. Additionally, in case a shooting direction is changed, the controller 250 may trace the identified static obstacle and dynamic obstacle and may apply their positions to a map. In this case, the robot 1 may identify and avoid dynamic/static obstacles near the robot 1 although the camera sensor 230 does not actually photograph the dynamic/static obstacles.

Figure 7:
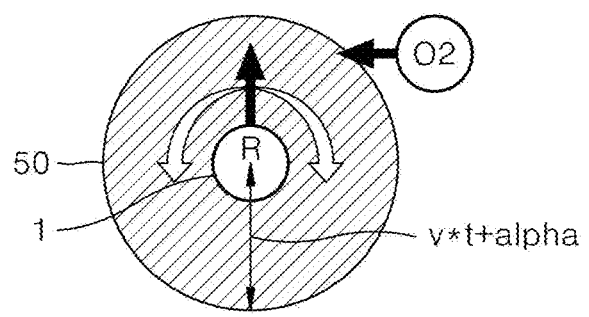
FIG. 7 illustrates a range where a robot senses a dynamic obstacle according to an embodiment.
Figure 7:
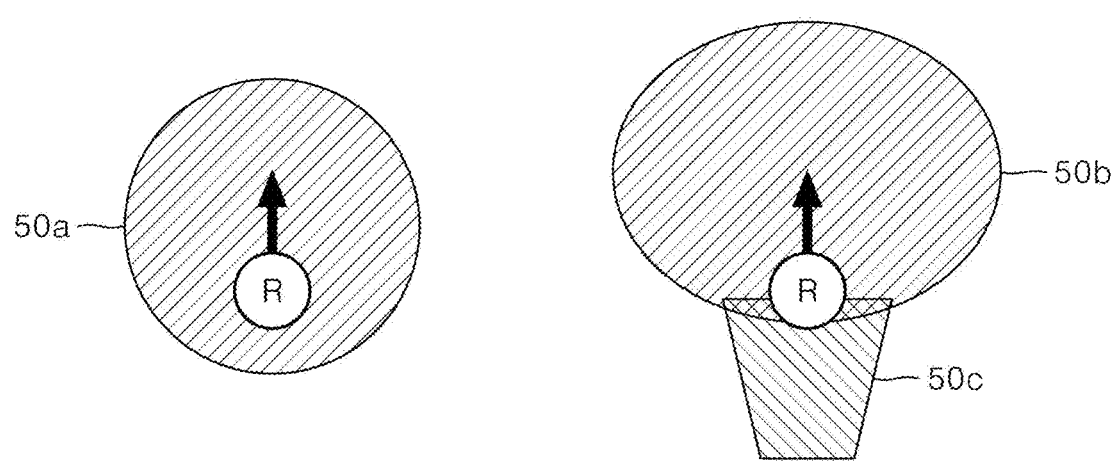

FIG. 7 illustrates a range where a robot according to an embodiment senses a dynamic obstacle. The controller 250 may set a range (an obstacle sensing range 50) sensed by the robot on the basis of v that is a velocity of the robot and on the basis of t seconds taken by the camera to reciprocate with respect to the robot 1 indicated by R. In this case, a value of "alpha" is considered a margin such that a temporal error or a mechanical error and the like are applied.

Thus, the controller 250 may calculate a range 50 where a dynamic obstacle is sensed on the basis of "v*t+alpha". A dynamic obstacle or a predicted value of the dynamic obstacle is in the range indicated by 50. In case a path for avoiding the obstacle is not estimated, the controller 250 may search another direction that is not yet confirmed.

In an exemplary embodiment, obstacle O2 is not in a sensing range 50 calculated by the controller 250 while the robot 1 moves in a direction of "TARGET". The controller 250, however, may calculate a direction and a velocity of movement of O2 and may determine that the robot 1 is likely to collide with O2 while the robot 1 moves to "TARGET". In case there is a possibility that the robot collides with O2, a new area needs to be searched for a change in the direction. Description in relation to this is provided with reference to FIG. 8.

In FIG. 7, the controller 250 may calculate an obstacle sensing range 50 using a velocity of movement of the robot 1 and using time (t) taken by the camera sensor 230 to capture an image in all directions or a direction of movement. Reference No. 50 in FIG. 7 has a circular shape with respect to the robot. The controller 250, however, may set an obstacle sensing range with respect to the forward direction of the robot as in 50a on the basis of the velocity of movement or the direction and the like of the robot.

Alternatively, the controller 250 may set an obstacle sensing range 50b in the direction where the robot moves to an oval shape. This is to allow the robot 1 to confirm entry of obstacles on the left and right sides. Additionally, the controller 250 may set an obstacle sensing range 50c to a small trapezoid shape in an opposite direction to the direction of movement of the robot 1. Thus, the obstacle sensing range is a range that includes 50b and 50c.

The velocity of the robot may include information on a direction and a speed. The controller 250 may calculate an obstacle sensing range on the basis of the information on a direction and a velocity. Additionally, the controller 250 may calculate whether a dynamic obstacle is included in the obstacle sensing range to adjust a shooting direction of the camera sensor or to change a direction of movement of the robot.

In this process, the controller 250 may recalculate a sensing range on the basis of the range where the dynamic obstacle is confirmed. For example, in case a dynamic obstacle is continuously sensed on the left side and on the right side although the controller 250 calculates the sensing range as 50b/50c in FIG. 7, the controller 250 may reset an obstacle sensing range as in 50 and may confirm approaches of obstacles in all directions including the forward, rearward, left and right directions.

Figure 8:
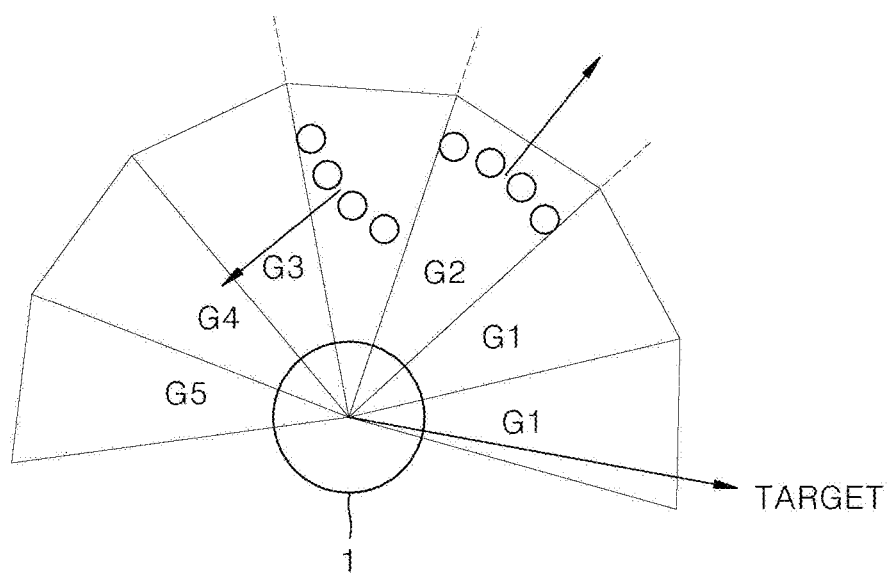
FIG. 8 illustrates a relationship between a direction of movement and a search order of a robot according to an embodiment.

FIG. 8 illustrates a relationship between a direction of movement of the robot and a search order according to an embodiment. The relationship may be applied to ii) the response mechanism for searching a space among the divided mechanisms of S16 in FIG. 2. In case a dynamic obstacle appears within a range where the robot moves as in FIG. 7, the controller 260 may search a new direction. In this case, the controller 250 may determine priority at the time of search of a new space.

The robot 1 is destined in a direction indicated by "TARGET". All areas searched by the robot 1 using the camera sensor 230 are expressed as triangles and the triangles denote a Field of View (FOV).

A search order of the robot 1 for movement in the direction of "TARGET" is set to G1/G2/G3/G4/G5. G1 is the closest direction to the direction of "TARGET" and in the direction of G1, there is no dynamic obstacle. Accordingly, G1 is given top priority among ranges searched by the robot 1.

Next, dynamic obstacles are positioned in a direction of G2, but a direction and path of movement of the dynamic obstacles do not overlap with the direction and path of movement of the robot 1 towards "TARGET". Accordingly, the controller 250 may place more weight on G2.

G3, G4 and G5 are placed on the opposite side of "TARGET". Accordingly, the controller 250 may place less weight on G3, G4 and G5. In case the robot 1 may not move in the directions of G1/G2, the controller 250 of the robot 1 may search areas G3, G4 and G5.

As described with reference to FIG. 8, the controller 250 may set a search order within a predetermined range near the robot 1 with respect to the viewing angle of the camera sensor 230. Additionally, the controller 250 may identify an obstacle and may set a moving path of the robot 1 on the basis of areas given high priorities.

The controller 250 may select a shortest path or a least time-consuming path among paths to the destination of TARGET without colliding with dynamic obstacles in the areas (G1 and G2) given high priorities for a search.

In summary, in case a dynamic obstacle is included in an obstacle sensing range, the controller 250 may divide a space near the robot into two or more search spaces with respect to the viewing angle of the camera sensor. Additionally, the controller 250 may compare a previous direction of movement of the dynamic obstacle or a new direction of movement of the dynamic obstacle with the point (TARGET) of the robot to set a moving path of the robot in each search space.

Figure 9:
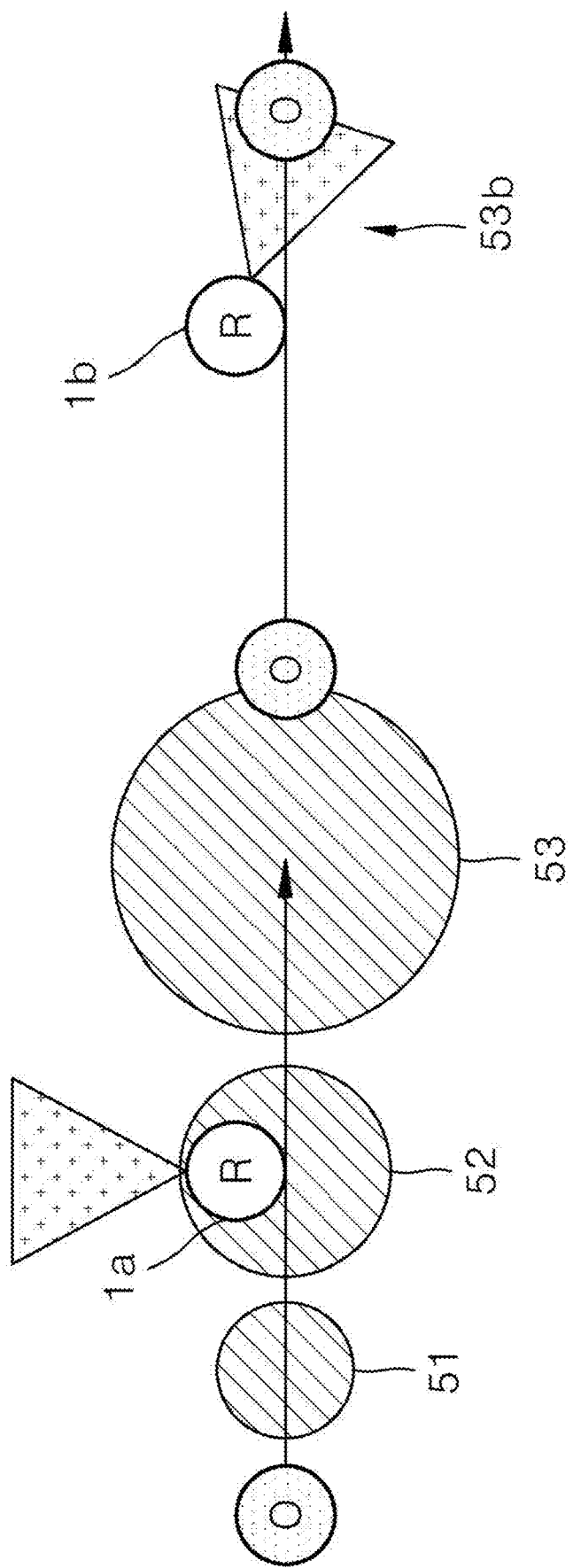
FIG. 9 illustrates a process of estimating a position of a dynamic obstacle according to an embodiment.

FIG. 9 illustrates a process of localizing a dynamic obstacle according to an embodiment.

An example where a direction of the camera sensor is changed in response to a dynamic obstacle in S16 is described above. Specifically, in FIG. 9, a dynamic obstacle indicated by "O" moves close to the robot 1*a* indicated by R.

An example where a person passes near the robot 1*a* is described. As a person does not move at a constant velocity or a constant direction, the controller 250 of the robot 1*a* calculates uncertainty about a position of the dynamic obstacle of "O". When obstacle position uncertainty about the obstacle of "O" is exploded as a result of the calculation, the controller 250 determines that the obstacle interferes with estimation of a travel path of the robot 1*a*.

In FIG. 9, position uncertainty about an obstacle on the basis of movement of the obstacle (O) near the robot 1*a* is respectively expressed as 51, 52 and 53. Reference Nos. 51, 52 and 53 denote a range of positions where an obstacle may be placed currently or later. When uncertainty is increased to predetermined magnitude or greater as in 53, the controller 250 of the robot 1*b* may rotate the camera towards the obstacle and may reconfirm the position of the obstacle to reduce the position uncertainty as in 53*b*.

In summary, the controller 250 may apply a velocity of a dynamic obstacle near the robot to calculate position uncertainty. When the uncertainty is at a predetermined level or higher as a result of the calculation, the controller 250 may control the camera sensor such that the camera sensor photographs the dynamic obstacle and may recalculate uncertainty of the dynamic obstacle.

Figure 10:
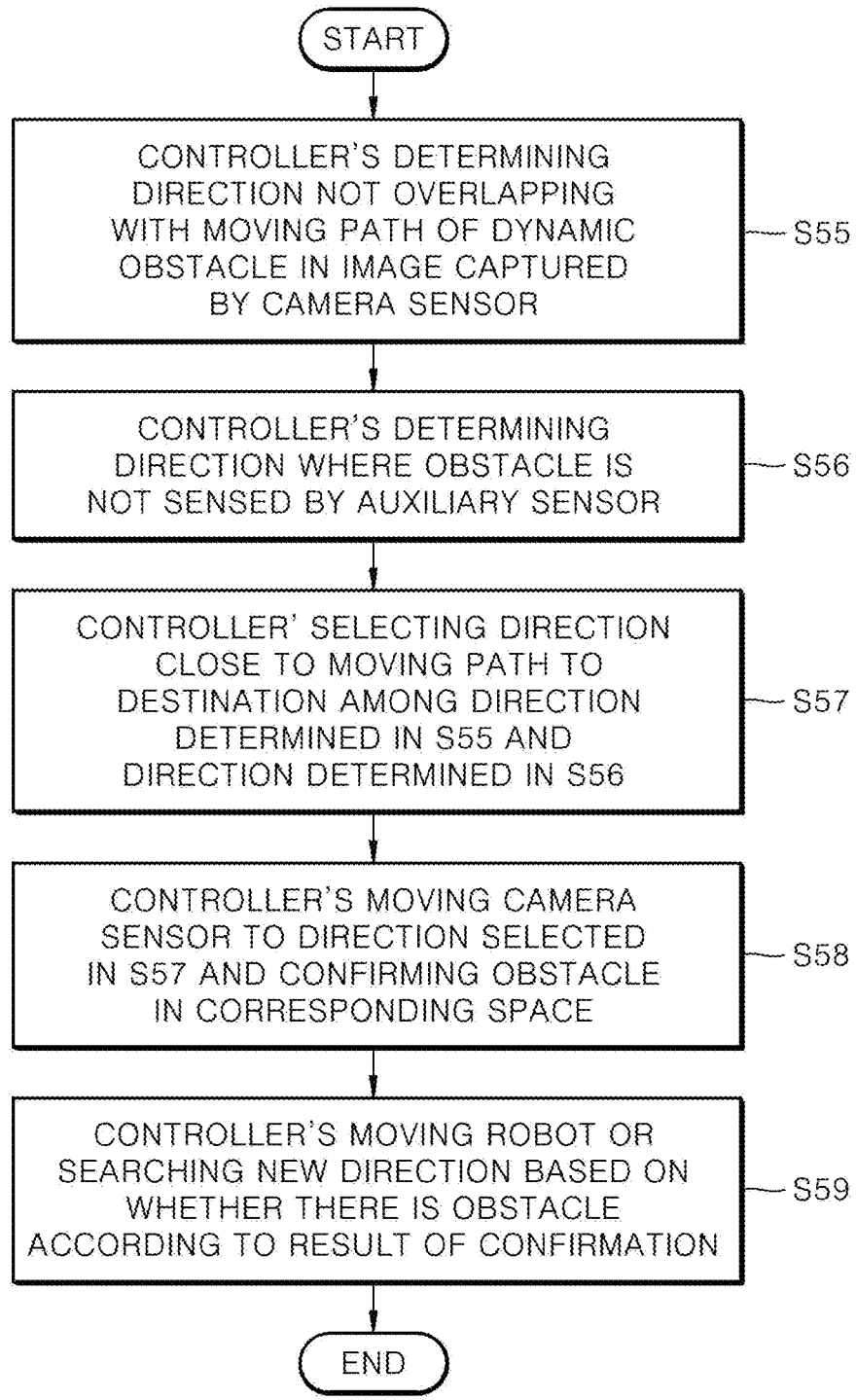
FIG. 10 illustrates a process of searching a space using an auxiliary sensor according to an embodiment.

FIG. 10 illustrates a process of searching a space using an auxiliary sensor according to an embodiment. In S16 of FIG. 2, the robot may perform a mechanism for searching a new space, and, in this process, the robot 1 may use another sensor as the auxiliary sensor in addition to the camera sensor 230. A LiDAR sensor 220 may be an example of the auxiliary sensor.

The controller 250 may determine a direction that is not overlapped with a moving path of a dynamic obstacle in an image captured by the camera sensor 230 (S55). In this case, the embodiment described with reference to FIG. 8 may be applied. The controller 250 may set weight to one or more directions and may select one or more directions given high weight.

Further, the controller 250 may determine a direction where the auxiliary sensor does not sense an obstacle (S56). In an exemplary embodiment, the LiDAR sensor 220 may sense whether there is an obstacle. The controller 250 may set weight to one or more directions and may select one or more directions given high weight.

The controller 250 may select a direction close to a moving path to a destination among the direction determined in S55 and the direction determined in S56 (S57).

Additionally, the controller 250 may move the camera sensor 230 in the direction selected in S57 to confirm whether there is an obstacle in the space (S58). As a result of the confirmation, the controller 250 may move the robot or perform a search of a new direction on the basis of whether there is an obstacle (S59).

In FIG. 10, the robot may improve velocity or efficiency of a search of a space using the auxiliary sensor such as a LiDAR sensor 220 with the viewing angle wider than that of the camera sensor 230 at the time when the robot needs to search a new space to avoid an obstacle.

In this case, a two-dimensional LiDAR sensor may be an example of the LiDAR sensor for rapid sensing. Alternatively, in case a three-dimensional LiDAR sensor performs sensing faster than the camera sensor 230, the three-dimensional LiDAR sensor may be used as the auxiliary sensor.

In the embodiment described above with reference to FIG. 7, there is a possibility (a predicted value) that a dynamic obstacle is placed in a sensing range 50 or that a dynamic obstacle moves into and placed in a sensing range 50. In case the controller 250 cannot estimate a path for avoiding the obstacle, the controller 250 may perform a primary determination using the auxiliary sensor. For example, the controller 250 may perform S55, S56 and S57 and determine a specific direction using the result of S55, S56, and S57, the controller 250 moves the camera sensor 230 in the determined specific direction (S58).

Figure 11:
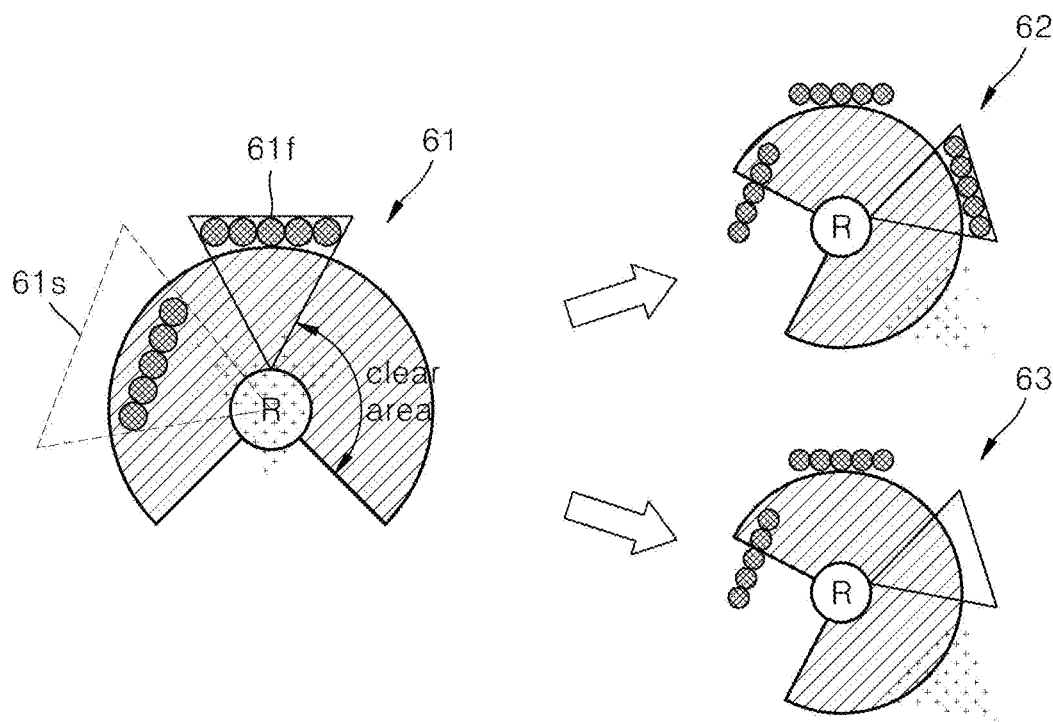
FIG. 11 illustrates a process of changing a direction using an auxiliary sensor according to an embodiment.

FIG. 11 illustrates a process of changing a direction using an auxiliary sensor according to an embodiment. A robot is indicated by "R". In a configuration indicated by 61, a camera sensor 230 of the robot (R) senses obstacles within a viewing angle as in 61*f*. Further, an auxiliary sensor (e.g., a LiDAR sensor) also senses obstacles as in 61*s*.

Accordingly, the robot 1 may determine that a clear area where the two sensors sense no obstacle is a candidate direction. Additionally, the robot 1 may move the camera sensor 230 in the direction. Thus, the camera sensor 230 may sense obstacles as in 62 or the camera sensor 230 may sense no obstacle as in 63.

As in 62, an obstacle (e.g. upward obstacles or downward obstacles), which is not previously detected by the auxiliary sensor, may be detected after the camera sensor 230 is moved to the clear area. In this case, the controller 250 re-searches a path after updating obstacle information.

Next, as in 63, in case the camera sensor 230 does not detect an obstacle either after the camera sensor 230 is moved to the clear area, the controller may estimate a travel path in the direction.

In summary, the controller 250, as in 61, may collect results of detection of an obstacle by the camera sensor 230 in a specific direction and results of detection of an obstacle by the LiDAR sensor 220 in a wider range of directions than the specific direction. Then the controller 250 may move the camera sensor 230 in a direction where the controller primarily may confirm that there is no obstacle, to determine whether there is an obstacle that cannot be confirmed by the LiDAR sensor 220.

Thus, in case the controller secondarily confirms there is no obstacle in the primarily confirmed direction, the controller 250 may estimate a moving path of the robot to move the robot as in 63. In case an obstacle is sensed in the primarily confirmed direction, the controller 250 may search a direction where the robot may travel among new directions as in 62.

FIGS. 10 and 11 are summarized as follows.

The LiDAR sensor 220, which is an example of the auxiliary sensor, measures a distance between an obstacle near the robot and the robot. Additionally, the controller 250 may confirm a clear area using results of sensing by the LiDAR sensor 220 and results of sensing by the camera sensor 230. The controller 250, as in 62 and 63, may reset a moving path of the robot on the basis of results of photography of the clear area by the camera sensor 230.

Figure 12:
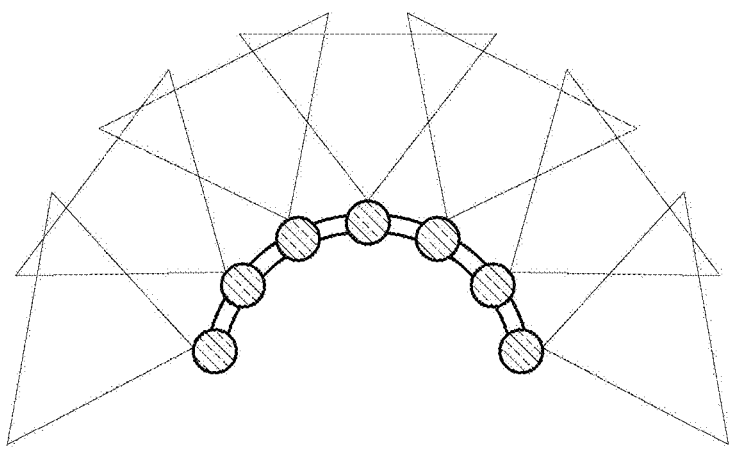
FIG. 12 illustrates a process of acquiring an image in a viewing angle range or greater by a camera sensor according to an embodiment.
Figure 12:
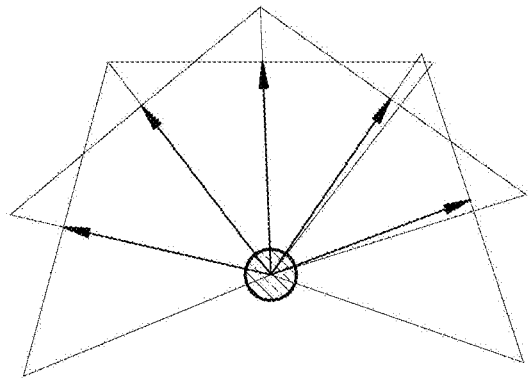

FIG. 12 illustrates a process of acquiring an image in a viewing angle range or greater by a camera sensor according to an embodiment.

Reference No. 65 in FIG. 12 indicates a process of capturing an image while a camera sensor moves on a rail (65r). Reference No. 66 in FIG. 12 indicates a process of capturing an image while the camera sensor rotates.

The camera sensor 230 has various properties on the basis of its performance. For example, a camera sensor 230 comprised of still cameras photographs surroundings of the robot in a state where the cameras are stopped, while a camera sensor 230 comprised of semi-moving cameras lowers velocity while the cameras move to acquire an image. The camera may be coupled to a predetermined mechanical component to adjust a direction. For example, the camera is placed on a predetermined rail to move or is engaged with a gear wheel such that a shooting direction is changed.

Further, a camera sensor 230 comprised of moving cameras may continue to capture an image while the camera moves.

The controller 250 may capture an image while moving or rotating the camera sensor 230 on a regular basis. A control process of the camera sensors 230 is described hereunder on the basis of features of each camera sensor 230.

In an exemplary embodiment, the camera sensor comprised still cameras may capture an image as in 65 or 66 of FIG. 12. The controller 250 may equally divide a path where the camera sensor on a rail may move, as in 65. Alternatively, the controller 250 may equally divide a rotatable angle, as in 66. Then the controller 250 may acquire an image in a state where the camera is stopped at the each point when moving/rotating the camera sensor 230.

In the case of a still camera, it takes a long time for the still camera to capture an image for a single period. When a still camera is used as the camera sensor 230, the controller 250 may acquire an image where blur is minimized despite a high level of uncertainty.

In an exemplary embodiment, in case the robot is provided with a camera sensor comprised of semi-moving cameras, the controller 250 may equally divide a path where the camera sensor on a rail may move as in 65. Alternatively, the controller 250 may equally divide a rotatable angle as in 66.

Then, the controller may acquire an image in a state where velocity of the camera is lowered at the point when moving the camera sensor. In case a semi-moving camera is used as the camera sensor 230, the controller 250 may acquire an image where blur and uncertainty are all at a predetermined level or below.

In an exemplary embodiment, in case the robot is provide with a camera sensor comprised of moving cameras, the controller 250 may capture a moving image while moving the camera sensor. That is, the controller 250 may acquire a steady continuous image using the moving camera.

When necessary, the controller 250 may lower a velocity of movement of the camera in a heavily blurred section. For example, the heavily blurred section is a section where a fast-moving obstacle is photographed. When the moving camera is used as the camera sensor 230, the controller 250 may minimize uncertainty.

Further, the controller 250 may reset a shooting direction of the still camera on the basis of a possibility that an obstacle appears when making the still camera to capture an image in a specific direction. For example, in case an obstacle is highly likely to appear from the left or from the right with respect to the robot, the controller 250 may set a direction of the still camera such that the still camera inclines in the direction.

For example, in case an obstacle is highly likely to appear from the left while the robot moves straight, the controller 250 may control the still camera such that shooting direction of the still camera is changed from the direction of the straight movement to a direction towards the left by angle A.

The angle A such as 10 degrees or 15 degrees and the like may denote a range in which objects in the direction of the straight movement are photographed in a state where the still camera slightly inclines from the direction of the straight movement. A size of the angle A may vary depending on a viewing angle range of the camera. For example, in case the viewing angle range is wide, the size of the angle A may increase. In case the viewing angle range is narrow, the size of the angle A may decrease.

For example, in case the viewing angle range is 90 degrees, when the angle A is set to 15 degrees, the camera sensor may capture an image between 30 degrees from the right and 60 degrees from the left with respect to the direction of the straight movement of the robot. In case the viewing angle range is 120 degrees, when the angle A is set to 20 degrees, the camera sensor may capture an image between 40 degrees from the right and 80 degrees from the left with respect to the direction of the straight movement of the robot.

Likewise, the controller 250 may reset a shooting direction of a moving camera on the basis of a possibility that an obstacle appears when the moving camera changes the shooting direction to the left or the right while capturing an image in a specific direction.

For example, in case an obstacle is highly likely to appear from the left or from the right with respect to the robot, the controller 250 may set a changed direction of the moving camera such that the camera changes its direction to the changed direction any time.

Suppose that an obstacle is highly likely to appear from the left while the robot moves straight. The controller 250 may set the shooting direction of the moving camera such that the shooting direction of the moving camera is changed from right to left direction (right-left direction) in case the shooting direction of the moving camera is changed from left to right direction (left-right direction). Alternatively, the controller 250 may set the shooting direction of the moving camera such that the shooting direction of the moving camera is changed in a left-right-left direction within a predetermined angle. The left-right-left direction means that the moving camera is changed to left direction at first, and then the moving camera is changed to right direction, and finally, the moving camera is return to the left direction.

For example, in case an obstacle is highly likely to appear from the left/right, the moving camera sensor may change its shooting direction between 30 degrees from the left and 30 degrees from the right with respect to the direction of the straight movement of the robot.

In case an obstacle is highly likely to appear from the left, the controller 250 may change the shooting direction of the moving camera between 40 degrees to the left and 20 degrees to the right with respect to the direction of the straight movement of the robot. The overall travel angle of moving camera is 60 degrees (40 degrees in left and 20 degrees in right). In this case, the moving camera may capture an image in the left range more frequently. The angles may vary depending on a viewing angle range.

For example, in case the viewing angle range is 90 degrees, the controller 250 may control the moving camera such that the shooting direction of the moving camera is set between 30 degrees to the right and 60 degrees to the left with respect to the direction of the straight movement of the robot. The overall travel angle of moving camera is 90 degrees (60 degrees in left and 30 degrees in right). In case the viewing angle range is 120 degrees, the controller 250 may control the moving camera such that the shooting direction of the moving camera is set between 40 degrees to the right and 80 degrees to the left with respect to the direction of the straight movement of the robot The overall travel angle of moving camera is 120 degrees (80 degrees in left and 40 degrees in right).

Figure 13:
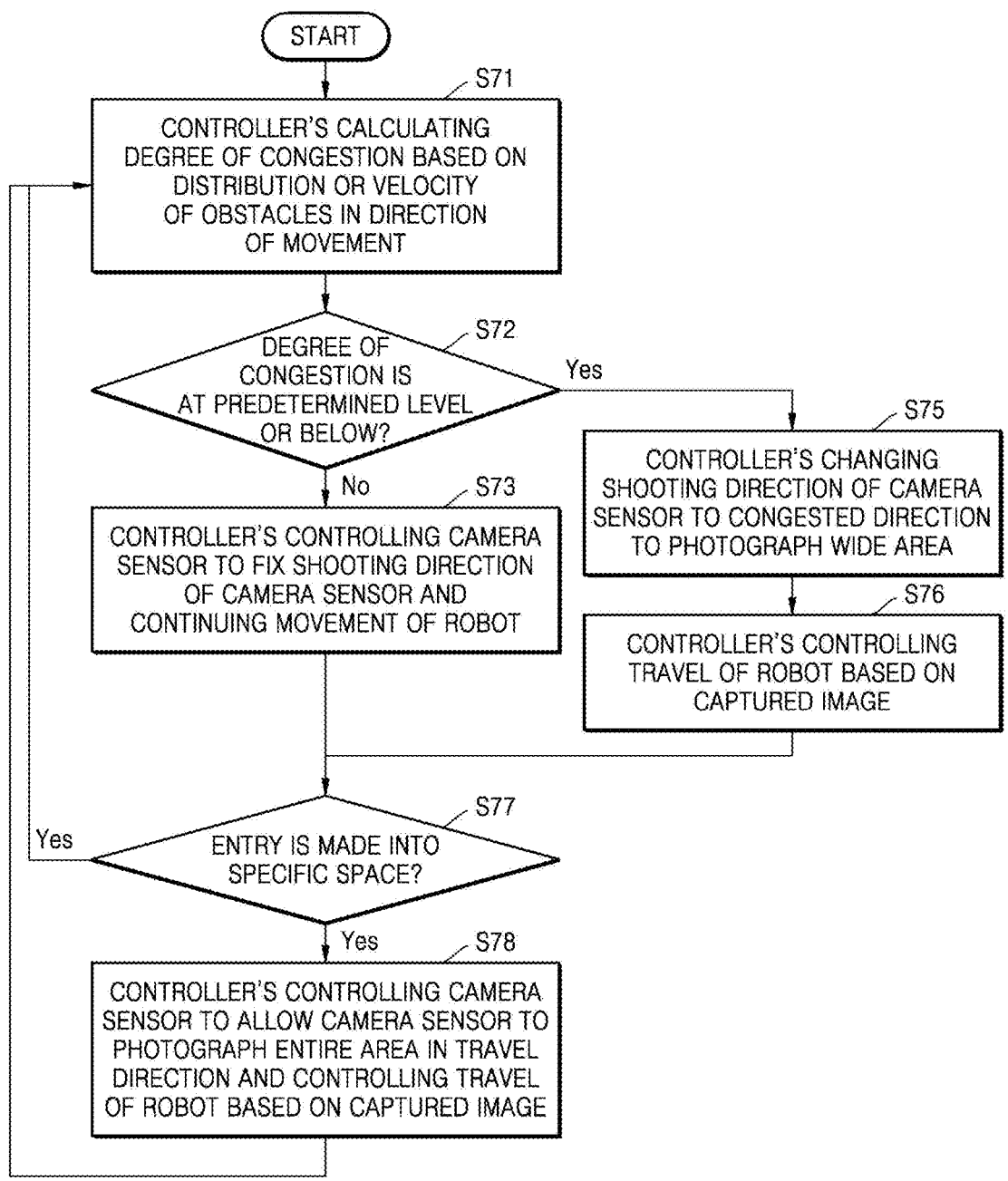
FIG. 13 illustrates a process of adjusting movement of a camera sensor by a controller on the basis of surrounding conditions according to an embodiment.

FIG. 13 illustrates a process of adjusting movement of a camera sensor on the basis of surrounding conditions by a controller according to an embodiment.

A space where the robot moves may be crowded on the basis of velocities of obstacles or distribution of obstacles near the robot. The controller 250 may calculate a degree of congestion by applying distribution or velocity of obstacles disposed in a direction of movement (S71). The obstacles may include one or more of a dynamic obstacle or a static obstacle.

In case the degree of congestion is at a predetermined level or below as a result of the calculation of the controller 250 (S72), the controller 250 may control the camera sensor to fix the shooting direction of the camera sensor and may continue the travel of the robot (S73). The shooting direction may include a travel direction.

In case the degree of congestion is at the predetermined level or above as a result of the calculation of the controller 250 (S72), the controller 250 may move the shooting direction of the camera sensor in a congested direction (to a congested area) to photograph a wide area (S75).

That is, the controller 250 may adjust the shooting direction of the camera sensor towards the congested area to avoid an obstacle in the area. Additionally, the controller 250 controls travel of the robot on the basis of the captured image (S76).

In S73 or S76, the controller may confirm whether the robot currently enters a specific area (S77). The specific area may include an area such as a crosswalk through which the robot has to pass within a predetermined period or a space such as a road on which vehicles move fast, and the like. A space where a velocity limit of the robot is at a specific value or higher may be an example of the specific space.

In the space, the robot has to move rapidly. Accordingly, the robot has to move while sensing obstacles rapidly. To this end, the controller 250 may control the camera sensor such that the camera sensor photographs an entire area in the direction of the travel of the robot (or an entire area near the robot) and may control travel of the robot on the basis of the captured images (S78).

Figure 14:
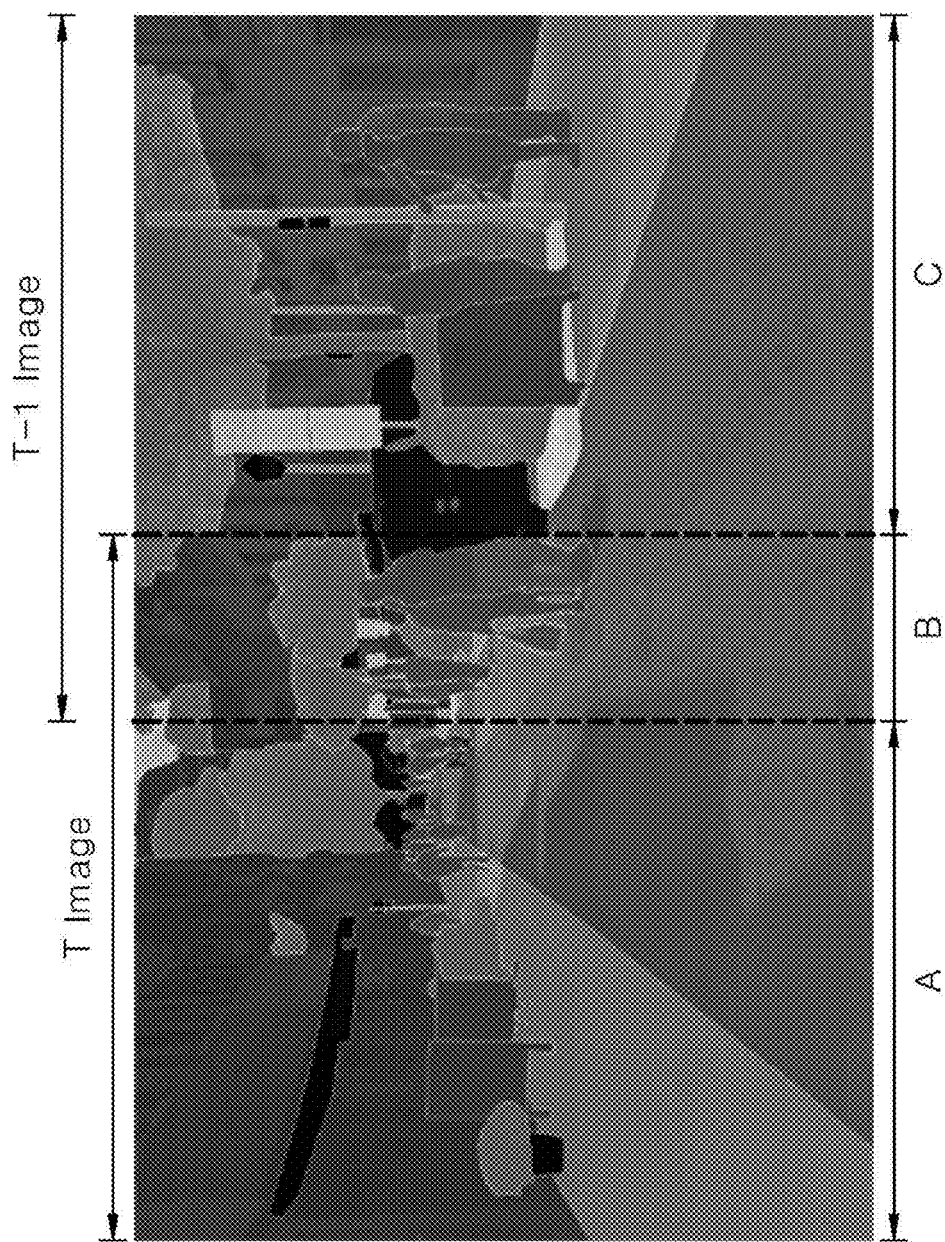
FIG. 14 illustrates a photography method of a camera sensor according to an embodiment.

FIG. 14 illustrates a photography method of a camera sensor according to an embodiment. The controller 250 captures an image in the direction of movement as in image T−1, and, as a result of scene parsing, determines a degree of congestion is high. In this case, the controller 250 may adjust the shooting direction of the camera sensor even in another area adjacent to the direction of movement to capture an image as in image T.

Specifically, the controller 250 may calculate a degree of congestion in the image T−1 (section B-C) captured by the camera sensor. In case the degree of congestion is high as a result of the calculation, the controller 250 may photograph section A-B and may generate the image T, so that the image T and image T−1 overlaps in area B.

In this case, the controller 250 may select a direction searched by the robot such that the robot avoids an obstacle in the direction where the robot moves (an area where the image T−1 is captured) to capture the image T. In this process, area B where the image T and the image T−1 overlap is created and section C may be information stored in the process of capturing the image T−1. Additionally, section A is a section additionally ensured through the photography of the image T. The controller 250 may identify an obstacle in section A-B-C to control movement of the robot.

Further, the robot may photograph a wide area as in S78 of FIG. 13. In this case, the controller 250 may move the camera sensor 230 and may control the camera sensor 230 such that the camera sensor 230 photographs a wide range in addition to a direction adjacent to the direction of the travel. On the basis of the result, the controller 250 may allow the robot to rapidly move while the robot does not collide in the specific space.

In summary, the controller 250 may confirm an obstacle in a third image (section A-B-C) where a first image (image T−1) captured by the camera sensor 230 in a first direction and a second image (image T) captured by the camera sensor 230 in a second direction are combined. Additionally, the controller 250 may control the shooting direction of the camera sensor 230 to create area B where the first image (image T−1) and the second image (image T) overlap.

An angle for photographing the two images may vary depending on a viewing angle or a photography method of the camera sensor 230.

When confirming a plurality of dynamic obstacles in an area corresponding to section B in the image T−1, the controller 250 may increase a size of section B. In this case, when the image T−1 is captured and then the image T is captured, a size of a change in angles of the shooting direction of the camera sensor may be smaller than a size of a reference angle. In case a viewing angle is 120 degrees, the reference angle for a change in angles may be 110 degrees. However, in case the controller 250 determines that the size of section B needs to increase, the angle of the camera sensor 230 may be changed by 100 degrees.

In this case, when confirming no obstacle is in an area corresponding to section B in the image T−1, the controller 250 may decrease the size of section B. In this case, when the image T−1 is captured and then the image T is captured, the size of the change in angles of the shooting direction of the camera sensor may be larger than the size of the reference angle. In case a viewing angle is 120 degrees, the reference angle for a change in angles may be 110 degrees.

However, in case the controller 250 determines that the size of section B needs to decrease, the angle of the camera sensor 230 may be changed by 115 degrees.

Figure 15:
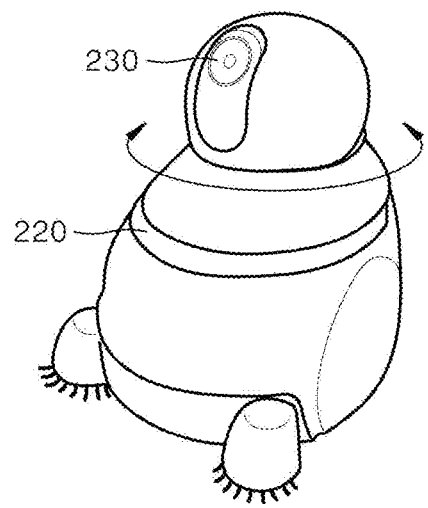
FIG. 15 illustrates a position where a camera sensor is disposed according to an embodiment.
Figure 15:
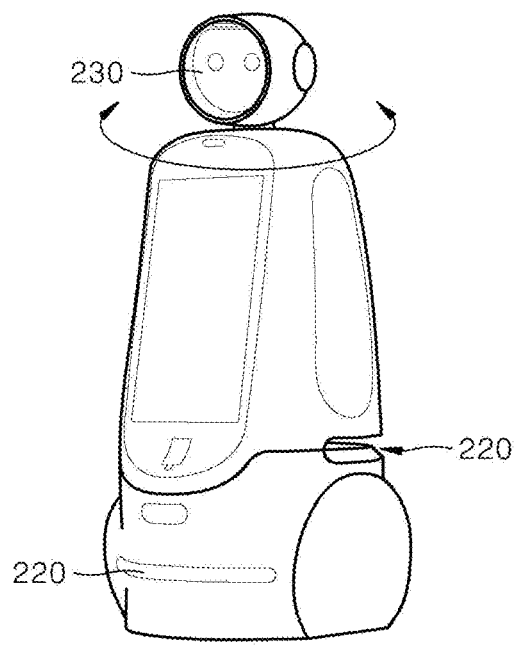

FIG. 15 illustrates an arrangement position of a camera sensor according to an embodiment. Reference No. 81 indicates a configuration where a camera sensor 230 is disposed at a head of a robot and a LiDAR sensor 220 is disposed at a position lower than that of the camera sensor 230. The head of the robot may rotate in the left-right direction. Accordingly, the camera sensor 230 may be rotated to the left or to the right to capture an image.

Reference No. 82 indicates a configuration where a camera sensor 230 is disposed at a head of a robot and a LiDAR sensor 220 is disposed at a position close to the ground and lower than that of the camera sensor 230. The head of the robot may rotate in the left or right direction. Accordingly, the camera sensor 230 may be rotated to the left or to the right to capture an image.

The robot may have various shapes in addition to the exemplary shape in FIG. 15 and may include a component configured to move or rotate the camera sensor 230. When a shooting direction of the camera sensor 230 is adjusted, the camera sensor may overcome viewing angle limitations and may photograph a wide area.

According to the embodiment of the present disclosure, failure to apply a situation out of the viewing angle due to a narrow FOV may be avoided when a single camera or a small number of cameras are used to recognize surrounding obstacles. That is, an image of a wide FOV may be generated using a small number of camera sensors and may have the same effect as an image captured using a large number of camera sensors, thereby making it possible to reduce the number of camera sensors.

Specifically, a controller 250 may move the camera sensor on a regular basis or according to situations to produce the effect of an expanded FOV. Further, the controller 250 may predict a position or a velocity of an obstacle, and the controller 250 may combine pieces of information on the predicted position of the obstacle and may input the information on the position of the obstacle to an expanded local map. In this process, a static obstacle may be accumulated in the form of weight on the map.

A shooting direction of the camera sensor 230 may be adjusted on the basis of a situation where external obstacles are arranged or on the basis of a velocity of movement of a robot, and the like. Accordingly, travel performance of the robot may improve on the basis of the effect of an expanded FOV. Further, obstacle information of a captured image is cumulatively stored. Accordingly, information on obstacles which are not photographed due to a change in the shooting directions of the camera sensor 230 may be traced and confirmed and may be applied to generation of a travel path of the robot.

Even in a situation where the robot may not move and may be isolated due to an obstacle and the like, the controller 250 may rotate or move the camera sensor 230 such that the camera sensor 230 photographs surroundings of the robot when robot is in stop state. Thus, the robot does not need to move or rotate to capture an image in all directions, thereby making it possible to enhance power efficiency.

In the present disclosure, the robot may denote a machine that can automatically deal with assigned jobs or can automatically operate using the abilities held by the robot. Specifically, robots that can recognize an environment, can make decisions and can perform operations on their own may be referred to as an intelligent robot.

Robots may be classified as an industrial robot, a medical robot, a domestic robot, a military robot and the like according to purposes or fields.

They may be provided with a moving unit 260 including an actuator or a motor and may perform various physical operations such as movement of their joints and the like. Further, for movable robots, the moving unit 260 may include a wheel, a brake, a propeller and the like. Through the moving unit 260, the movable robots may travel on the ground or may fly in the air.

Artificial intelligence is a field of studying artificial intelligence or methodology of implementing artificial intelligence, and machine learning is a field of defining various problems which are handled in the field of artificial intelligence and studying methodology of solving the problems. Machine learning is also defined as an algorithm for enhancing performance of a certain operation through steady experiences thereof.

An artificial neural network (ANN) is a model which is used in machine learning and may refer to all models having problem solubility which include neurons (nodes) forming a network by coupling to synapses. An ANN is defined by a connection pattern between neurons of different layers, a learning process of updating model parameters, and an activation function of generating an output value.

An ANN selectively includes an input layer, an output layer, and one or more hidden layers. Each layer includes one or more neurons, and an ANN includes synapses connecting neurons. In an ANN, each neuron outputs input signals which are input from synapses, a weighting value, and a function value of an activation function with respect to deflection.

A model parameter refers to a parameter which is determined by learning and includes a weighting value for connection by synapses and deflection of neurons. A hyper parameter refers to a parameter which is to be set before learning in a machine learning algorithm and includes a learning rate, a repetition number, a minimum arrangement size, and an initialization function.

The purpose of learning of an ANN is to determine model parameters that minimize a loss function. A loss function may be used as an indicator for determining optimal model parameters in the course of learning an ANN.

Machine learning may be classified into supervised learning, unsupervised learning, and reinforcement learning depending on learning types.

Supervised learning refers to a learning method of causing an ANN to learn in a state in which a label is given to learning data, where a label refers to a correct answer (or a resultant value) which is to be inferred by the ANN when learning data is input to the ANN. Unsupervised learning refers to a learning method of causing an ANN to learn in a state in which a label is not given to learning data. Reinforcement learning refers to a learning method of causing an agent which is defined in a certain environment to learn selection of an action or an action sequence of maximizing cumulative compensation in each state.

Machine learning which is implemented by a deep neural network (DNN) including a plurality of hidden layers is also referred to as deep learning, and deep learning is a part of machine learning. In the following description, machine learning includes deep learning.

The artificial intelligence of the controller 250, i.e., sub-components of the controller 250 of the robot 100 may perform a function for artificial intelligence. The artificial intelligence of the controller 250 may include software or hardware.

In this case, the communicator 280 of the robot 100 may transmit and receive data to and from a robot that provides another AI function or external devices such as an AI server 700 which is described below with reference to FIG. 12 using wired or wireless communication technology. For example, the communicator 280 may transmit and receive sensor information, a user input, a learning model, a control signal, and the like to and from external devices.

Examples of communication technology which is used by the communicator 280 include global system for mobile communication (GSM), code-division multi access (CDMA), long-term evolution (LTE), 5G, wireless LAN (WLAN), wireless-fidelity (Wi-Fi), Bluetooth™, radio frequency identification (RFID), infrared data association (IrDA), ZigBee, and near-field communication (NFC).

The interface 290 acquires various types of data.

The interface 290 may receives an image signal using camera sensor 230, and may include a microphone that receives an audio signal, and a user input that receives information from a user. Information acquired by the obstacle sensor like LiDAR sensor 220, the camera sensor 230, or the microphone is referred to as sensing data or sensor information.

The interface 290, various types of sensors 220 and 230, and a wheel encoder of the moving unit 260 may acquire learning data for model learning, input data which is to be used for acquiring an output using a learning model. These elements may acquire raw input data. In this case, the controller 250 or the artificial intelligence extracts input features as a pre-process for input data.

The artificial intelligence causes a model constituted by an ANN to learn using learning data. A learned ANN is referred to as a learning model. A learning model may be used to infer a resultant value with respect to new input data instead of learning data, and the inferred value may be used as a basis for determination which is required for a robot 100 to perform a certain operation.

Figure 16:
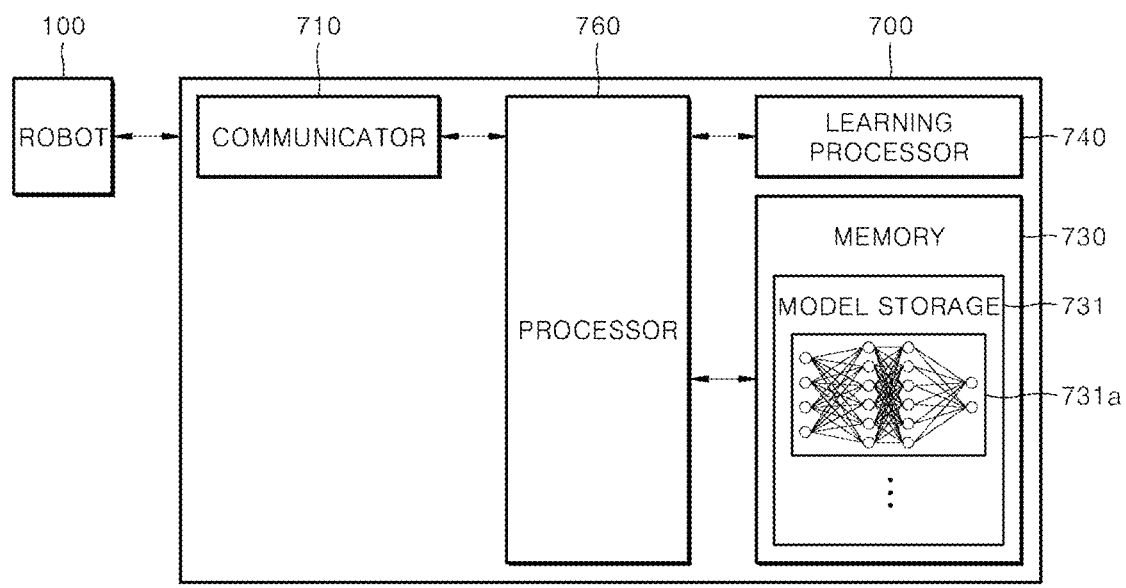
FIG. 16 illustrates an example configuration of an AI server according to an embodiment.

The artificial intelligence may perform AI processing along with the learning processor 740 of the AI server 700 of FIG. 16.

The artificial intelligence of the controller 250 includes a memory which is incorporated into the robot 100 or implemented therein. Alternatively, the artificial intelligence of the controller 250 may be implemented using an independent memory, an external memory coupled to the robot 100, or a memory which is held in an external device.

The robot 100 acquires at least one of internal information of the robot 100, surrounding environmental information of the robot 100, and user information using various sensors.

Examples of the sensors included in the robot 100 include a proximity sensor, an illuminance sensor, an acceleration sensor, a magnetic sensor, a gyro sensor, an inertia sensor, an RGB sensor, an IR sensor, a fingerprint recognition sensor, an ultrasonic sensor, an optical sensor, a microphone, a LiDAR sensor 220, an obstacle sensor, a camera sensor 230, and a radar.

The interface 290 generates an output associated with a visual sense, an auditory sense, or a haptic sense.

The interface 290 includes a display that outputs visual information, a speaker that outputs auditory information, and a haptic portion that outputs haptic information.

A memory built in the robot 100 stores data for supporting various types of functions of the robot 100. For example, the memory may store input data, learning data, learning models, and learning histories which are acquired by various sensors and the interface 230 which are built in the robot 100.

The controller 250 may determine at least one executable operation of the robot 100 based on information which is determined or generated using a data analysis algorithm or a machine learning algorithm. The controller 250 may perform the determined operation by controlling the elements of the robot 100.

For this purpose, the controller 250 may request, retrieve, receive, or utilize data in the artificial intelligence or the memory, and control the elements of the robot 100 such that a predicted operation or an operation determined to be preferable out of one or more executable operations is executed.

When cooperation with an external device is required for executing the determined operation, the controller 250 may generate a control signal for controlling the external device and transmit the generated control signal to the external device.

The controller 250 may acquire intention information from a user input and determine requirements of the user on the basis of the acquired intention information.

The controller 250 may acquire intention information corresponding to a user input using at least one or more of a speech-to-text (STT) engine for converting a speech input into text and a natural language process (NLP) engine for acquiring intention information in a natural language.

At least one of the STT engine and the NLP engine may be constituted by an ANN in accordance with a machine learning algorithm. At least one of the STT engine and the NLP engine may be an engine which has learned by the artificial intelligence, an engine which has learned by the learning process 740 of the AI server 700, or an engine which has learned by distributed processes thereof.

The controller 250 may collect history information including operation details of the robot 100 or feedback of a user which is used for the operation and store the collected history information in the memory or the artificial intelligence or transmit the collected history information to an external device such as the AI server 700. The collected history information may be used to update a learning model.

The controller 250 may control at least a part of the elements of the robot 100 in order to drive an application program stored in the memory 170. In addition, the controller 250 may allow two or more of the elements of the robot 100 to operate in combination in order to drive an application program.

Alternatively, an independent artificial intelligence server (an AI server) communicating with the robot 100 may be provided and process information which is provided by the robot 100.

FIG. 16 illustrates an example configuration of an AI server.

FIG. 16 illustrates a configuration of an AI server according to an embodiment of the invention.

An artificial intelligence server, that is, an AI server 700, refers to a device that causes an ANN to learn using a machine learning algorithm or uses a learned ANN. The AI server 700 may include a plurality of servers and perform distributed processes and may be defined as a 5G network. The AI server 700 is provided as a portion of an AI device 100 and perform at least a part of AI processing together.

The AI server 700 includes a communicator 710, a memory 730, a learning processor 740, and a processor 760.

The communicator 710 transmits and receives data to and from an external device such as the robot 100.

The memory 730 includes a model storage 731. The model storage 731 stores a model which is learning or learned (or an artificial neural network 231a) via the learning processor 740.

The learning processor 740 causes the artificial neural network 231a to learn using learning data. A learning model may be used in a state in which it is mounted in the AI server 700 of an ANN or may be used in a state in which it is mounted in an external device such as the robot 100.

A learning model may be implemented in hardware, in software, or in a combination of hardware and software. When a part or the whole of a learning model is implemented in software, one or more instructions constituting the learning model may be stored in the memory 730.

The processor 760 infers a resultant value for new input data using a learning model and a response or a control command based on the inferred value.

In particular, in the present disclosure, the artificial intelligence of the controller 250 or the AI server 700 may output information on whether an object disposed around the robot is a dynamic object or static object or robot in an input image. For example, when an image of a nearby object is input to the AI of the controller 250 or the AI server 700, the AI of the controller 250 and the AI server 700 analyze the image to determine whether the photographed object is a robot or an object, or more particularly, a moving object or static object rather than the object and to output.

In some exemplary embodiments, when the photographed object is a moving object, the artificial intelligence of the controller 250 may determine moving direction or moving speed, and the controller 250 may determine the shooting direction of camera.

This determination process has been described in FIG. 2, FIG. 6, FIG. 10, and FIG. 13.

According to the present disclosure, when the artificial intelligence of the controller 250 is mounted on the robot, it is possible to improve accuracy in identifying a dynamic obstacle.

That is, an AI technology may be used for the robot 100, and the robot 100 may include a guide robot, a transport robot, a cleaning robot, a wearable robot, an entertainment robot, a pet robot, an unmanned flying robot, and the like.

The robot 100 may include a robot controller that controls operation, and the robot controller may refer to software or a chip implemented as hardware.

The robot 100 obtains state information related to the robot 100a based on sensor information obtained from various types of sensors or detects (or recognizes) the surrounding environment and an object or generates map data, or determines a moving route and travel plans of the robot, or determines response to user interaction, or determines operation of the robot.

The robot 100 may use sensor information acquired from at least one sensor among a LiDAR, a radar, and a camera to determine a movement route and travel plans of the robot 100.

The robot 100 may perform the above operations using a learning model including at least one ANN. For example, the robot 100a may recognize a surrounding environment and an object using a learning model and may determine operation of the robot 100a based on the recognized surrounding environment information or object information. The learning model may be directly learned by the robot 100a or may be learned by an external device such as the AI server 200.

In this case, the robot 100 may perform operation of the robot 100 by generating a result using a direct learning model and may also perform the operation of the robot 100 by transmitting sensor information to the external device such as the AI server 700 and receiving the generated result thereof.

The robot 100 determines a moving route and travel plans of the robot 100 based on at least one of map data, object information detected from sensor information, or object information obtained from an external device, and controls the moving unit 260 to determine the moving route and the travel plans of the robot 100 to travel the robot 100.

The map data may include object identification information on various types of objects disposed in the space where the robot 100 moves. For example, the map data may include object identification information related to fixed objects such as walls and doors and movable objects such as flower pots and desks. The object identification information may include a name, a type, a distance, a position, and the like.

In some exemplary embodiments, the robot 100 may control the moving unit 260 based on the control/interaction of the user, to thereby perform operation or travelling of the robot 100. In this case, the robot 100 may obtain intention information related to the interaction determined based on the user's operation or voice utterance, and determine the response based on the obtained intention information to perform the operation of the robot 100.

In some exemplary embodiments, the robot 100 performs autonomous driving, and in this process, the AI technology is applied, and may include a mobile robot, a vehicle, an unmanned flight vehicle, and the like.

The autonomous robot 100 may include an autonomous driving control portion that controls a function for the autonomous driving, and the autonomous control portion may refer to software or a chip implemented as hardware. The autonomous driving controller may be included in the robot 100 as a component of the autonomous robot 100 and the autonomous driving controller is provided as additional hardware outside of the robot 100 to be connected thereto.

The autonomous robot 100 may obtain state information related to the autonomous robot 100 based on sensor information obtained from various types of sensor or may detect (or recognize) the surrounding environment and an object or may generate map data or may determine a travel route and travel plans of the robot 100, or may determine operation of the robot 100.

The autonomous robot 100 may use sensor information obtained from at least one sensor among a LiDAR, a radar, and a camera, similar to the robot 100, in order to determine the movement route and travel plans of the robot 100.

In particular, the autonomous robot 100 may recognize the environment with respect to or the objects disposed in invisible areas or areas having a predetermined distance or more by receiving the sensor information from the external devices or may receive information directly recognized by the external devices.

The autonomous robot 100 may perform the above operations using a learning model including at least one ANN. For example, the autonomous robot 100 may recognize a surrounding environment and an object using a learning model and may determine a driving line of the robot based on the recognized surrounding environment information or object information. The learning model may be learned directly by the autonomous vehicle 100b or may be learned by an external device such as the AI server 700.

In this case, the autonomous robot 100 may perform operation by generating a result using a direct learning model and may also transmit sensor information to an external device such as an AI server 700 and may receive the generated result to perform the operation of the robot 100.

The autonomous robot 100 determines a movement route and travel plans of the autonomous robot 100 based on at least one of map data, object information detected from sensor information, or object information obtained from an external device, and controls the moving unit 260 to travel the autonomous travelling robot 100 along the determined movement route and according to travelling plans of the robot 100.

The map data may include object identification information related to various types of objects disposed in a space (e.g., a road) where the autonomous vehicle 100b travels. For example, the map data may include object identification information related to fixed objects such as street lights, rocks, buildings, and movable objects such as vehicles and pedestrians. The object identification information may include a name, type, a distance, a location, and the like.

In some exemplary embodiments, the autonomous robot 100 may control the moving unit 260 based on control/interaction of the user to perform operation of the robot 100 or travel. In this case, the autonomous robot 100 may obtain the intention information related to the interaction based on operation of the user or voice utterance, and determine the response based on the obtained intention information to perform the operation thereof.

In some exemplary embodiments, the robot 100 may use the AI technology and autonomous driving technology, and may include guide robots, transport robots, cleaning robots, wearable robots, entertainment robots, pet robots, unmanned flying robots, and the like.

The robot 100 that performs a function for autonomous driving may be collectively referred to as a device that moves along a given moving line of the robot 100 without control of the user or moves by determining the moving line of the robot 100 by itself.

The robot 100 that performs a function for autonomous driving may use a common sensing method to determine at least one of a moving route or travelling plans of the robot 100. For example, the robot 100 that performs the autonomous driving function may determine at least one moving route or travelling plans of the robot 100 based on the information sensed by a LiDAR, a radar, and a camera.

Although components included in the exemplary embodiment of the present disclosure are described as being combined to one, or as being coupled to operate, such exemplary embodiment is not necessarily limited to this specific example, and these components may be selectively combined to one or more and coupled to operate within the purpose range of the present disclosure. Further, although all of the components may be implemented as an independent hardware, a part or all of each of the components may be selectively combined and implemented as a computer program that has a program module to perform a part or all of the functions combined in one or a lot of hardware. Codes and code segments that are included in the computer program may be easily deduced by those skilled in the art of the present disclosure. The computer program may be stored in computer readable media that a computer may read, and may be read and implemented by the computer, so as to implement the present disclosure. The storage medium of the computer program may include a storage medium including a semiconductor recording element, an optical recording medium, a magnetic recording medium. Further, the computer program that implements the embodiment of the present disclosure may include a program that is transmitted in real time through an external apparatus.

While the present disclosure has been mainly described referring to the exemplary embodiments of the present disclosure hereinabove, various modifications and changes can be made at the level of those skilled in the art. Therefore, unless such modifications and changes do not deviate from the range of the present disclosure, it will understand that they are included in the scope of the present disclosure.

Other embodiments are within the scope of the following claims.

What is claimed is:

1. A robot that identifies a dynamic obstacle, comprising:
a camera sensor which is disposed at the robot and shooting direction of the camera sensor is to be adjusted; and
a controller configured to identify an obstacle in an image captured by the camera sensor in a first direction, and on the basis of a velocity of movement of the identified obstacle, a degree of congestion based on distribution of the obstacle and a velocity of movement of the robot, to change a velocity and direction of the camera sensor or velocity of movement of the robot for sensing the obstacle and to generate a moving path of the robot,
wherein the controller stores information on a velocity of movement of a first dynamic obstacle and on a first static obstacle identified in the captured image, and
the controller calculates position uncertainty about the first dynamic obstacle and a position of the first static obstacle using an image captured in a second direction partially overlapping with the first direction, a difference between the first direction and the second direction and the stored information;
wherein the controller calculates an obstacle sensing range using the velocity of movement of the robot and time taken by the camera sensor to capture an image in all directions or a direction of movement, and
the controller calculates whether the first dynamic obstacle is included in the obstacle sensing range to adjust a shooting direction of the camera sensor or to change a direction of movement of the robot.

2. The robot of claim 1, wherein, in case no dynamic obstacle is near the moving path of the robot or in case a dynamic obstacle moves farther away from the moving path as a result of identification of an obstacle in the image by the controller, the controller moves the robot along the moving path and controls the camera sensor such that the camera sensor is fixed in a direction of the movement.

3. The robot of claim 1, wherein the controller determines adjustment of a direction of the camera sensor in a direction except a direction of the moving path as a result of identification of an obstacle in the image by the controller.

4. The robot of claim 1, wherein, in case the first dynamic obstacle is in the obstacle sensing range, the controller divides a surrounding space of the robot into two or more search spaces with respect to a viewing angle of the camera sensor, then compares a direction of movement of the first dynamic obstacle or a direction of movement of the second dynamic obstacle with a target point of the robot on the basis of each search space, and sets the moving path of the robot.

5. The robot of claim 1, wherein the controller calculates position uncertainty by applying a velocity of a dynamic obstacle near the robot, and, in case the uncertainty is at a predetermined level or above, the camera sensor photographs the dynamic obstacle and the controller recalculates the uncertainty.

6. The robot of claim 1, wherein the robot further comprises a LiDAR sensor configured to measure a distance between an obstacle near the robot and the robot, and
wherein the controller confirms a clear area using results of sensing by the LiDAR sensor and sensing by the camera sensor, and resets the moving path of the robot on the basis of results of photography of the clear area by the camera sensor.

7. The robot of claim 1, wherein the controller calculates a degree of congestion, to which distribution or velocity of obstacles disposed in a direction of movement of the robot is applied, and
when the degree of congestion is at a predetermined level or above, the controller adjusts a shooting direction of the camera sensor towards an area having a high degree of congestion.

8. The robot of claim 1, wherein the controller determines an obstacle in a third image where a first image photographed by the camera sensor in a first direction and a second image photographed by the camera sensor in a second direction are combined, and
the first image and the second image have an overlapping area.

9. A method of identifying a dynamic obstacle, comprising:
photographing surroundings of a robot in a first direction and generating an image by a camera sensor disposed at the robot;
identifying an obstacle in the image, and on the basis of a velocity of movement of the identified obstacle, a degree of congestion based on distribution of the obstacle and a velocity of movement of the robot, changing a velocity and direction of the camera sensor or velocity of movement of the robot for sensing the obstacle by a controller of the robot;
generating a moving path of the robot by the controller;
storing information on a velocity of movement of a first dynamic obstacle and on a first static obstacle identified in the captured image by the controller;
calculating position uncertainty about the first dynamic obstacle and a position of the first static obstacle by the controller, using an image captured in a second direction partially overlapping with the first direction, a difference between the first direction and the second direction and the stored information;
calculating an obstacle sensing range by the controller, using the velocity of movement of the robot and time taken by the camera sensor to capture an image in all directions or a direction of movement; and
calculating whether the first dynamic obstacle is in the obstacle sensing range by the controller, to adjust a shooting direction of the camera sensor or to change a direction of movement of the robot.

10. The method of claim 9, wherein the method further comprises, in case no dynamic obstacle is near a moving path of the robot or in case a dynamic obstacle moves farther away from the moving path as a result of identification of an obstacle in the image by the controller, controlling the camera sensor such that the camera sensor is fixed in a direction of the movement by the controller while the controller moves the robot along the moving path.

11. The method of claim 9, wherein the method further comprises, determining adjustment of a direction of the camera sensor in a direction except a direction of the moving path as a result of identification of an obstacle in the image by the controller.

12. The method of claim 9, further comprising:
dividing a surrounding space of the robot into two or more search spaces with respect to a viewing angle of the camera sensor by the controller in case the first dynamic obstacle is in the obstacle sensing range; and
comparing a direction of movement of the first dynamic obstacle or a direction of movement of the second dynamic obstacle with a target point of the robot on the basis of each search space, and setting the moving path of the robot by the controller.

13. The method of claim 9, further comprising:
calculating position uncertainty by applying a velocity of a dynamic obstacle near the robot by the controller; and
photographing the dynamic obstacle by the camera sensor and recalculating the uncertainty by the controller, in case the uncertainty is at a predetermined level or above.

14. The method of claim 9, further comprising:
measuring a distance between an obstacle near the robot and the robot by a LiDAR sensor of the robot;
confirming a clear area by the controller using results of sensing by the LiDAR sensor and sensing by the camera sensor; and
resetting the moving path of the robot by the controller on the basis of results of photography of the clear area by the camera sensor.

15. The method of claim 9, further comprising:
calculating a degree of congestion, to which distribution or velocity of obstacles disposed in a direction of movement of the robot is applied, by the controller; and
adjusting a shooting direction of the camera sensor towards an area having a high degree of congestion by the controller in case the degree of congestion is at a predetermined level or above.

16. The method of claim 9, wherein the method further comprises, determining an obstacle by the controller in a third image where a first image photographed by the camera sensor in a first direction and a second image photographed by the camera sensor in a second direction are combined, and
the first image and the second image have an overlapping area.

17. The robot of claim 1, wherein the controller determines a shooting direction of the camera sensor and generates moving path of the robot using time taken to change the shooting direction of the camera sensor.

18. The robot of claim 1, wherein the camera sensor moves on a rail.

19. The method of claim 9, wherein the controller determines a shooting direction of the camera sensor and generates moving path of the robot using time taken to change the shooting direction of the camera sensor.

20. The method of claim 9, wherein the camera sensor moves on a rail.

* * * * *